US012711922B2

(12) United States Patent
Yuan et al.

(10) Patent No.: US 12,711,922 B2
(45) Date of Patent: Aug. 18, 2026

(54) CONDUCTION CONTROL CIRCUIT, DISPLAY PANEL AND DISPLAY DEVICE

(71) Applicants: Hefei BOE Joint Technology Co., Ltd., Hefei (CN); BOE Technology Group Co., Ltd., Beijing (CN); Beijing BOE Technology Development Co., Ltd., Beijing (CN)

(72) Inventors: Zhidong Yuan, Beijing (CN); Yongqian Li, Beijing (CN); Xue Dong, Beijing (CN)

(73) Assignees: Hefei BOE Joint Technology, Co., Ltd., Hefei (CN); BOE Technology Group Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 201 days.

(21) Appl. No.: 18/835,768

(22) PCT Filed: Sep. 11, 2023

(86) PCT No.: PCT/CN2023/118094

§ 371 (c)(1),
(2) Date: Aug. 5, 2024

(87) PCT Pub. No.: WO2025/054784

PCT Pub. Date: Mar. 20, 2025

(65) Prior Publication Data

US 2026/0188237 A1 Jul. 2, 2026

(51) Int. Cl.
*G09G 3/36* (2006.01)
*G09G 3/32* (2016.01)
(Continued)

(52) U.S. Cl.
CPC ............. *G09G 3/3266* (2013.01); *G09G 3/32* (2013.01); *G09G 3/3275* (2013.01);
(Continued)

(58) Field of Classification Search
CPC ...... G09G 3/3266; G09G 3/32; G09G 3/3275; G09G 2300/0408; G09G 2300/0819;
(Continued)

(56) References Cited

U.S. PATENT DOCUMENTS

2020/0243032 A1* 7/2020 Gu .......................... G11C 7/02

FOREIGN PATENT DOCUMENTS

CN 1143171 C 3/2004
CN 103680442 A 3/2014
(Continued)

OTHER PUBLICATIONS

Extended European Search Report received for European Application No. 23951731.1, mailed on Oct. 13, 2025, 14 pages.

*Primary Examiner* — Deeprose Subedi
(74) *Attorney, Agent, or Firm* — ArentFox Schiff LLP; Michael Fainberg

(57) ABSTRACT

A conduction control circuit includes: a gating control circuit, coupled to a first node, and configured to provide a signal of a first clock signal terminal to the first node in response to signals of a plurality of different gating control signal terminals; a control circuit, coupled to the first node and a second node, and configured to provide the signal of the first clock signal terminal or a signal of a first power supply terminal to the second node in response to a signal of the first node; and a conduction signal output circuit, coupled to the second node and a third node, and configured to provide a signal of a second clock signal terminal to a driving output terminal in response to a signal of the second
(Continued)

node, and provide a signal of a first reference signal terminal to the driving output terminal.

20 Claims, 12 Drawing Sheets

(51) Int. Cl.
*G09G 3/3266* (2016.01)
*G09G 3/3275* (2016.01)

(52) U.S. Cl.
CPC .............. *G09G 2300/0408* (2013.01); *G09G 2300/0819* (2013.01); *G09G 2310/0267* (2013.01); *G09G 2310/0275* (2013.01); *G09G 2310/08* (2013.01); *G09G 2330/023* (2013.01)

(58) Field of Classification Search
CPC ... G09G 2310/0267; G09G 2310/0275; G09G 2310/08; G09G 2330/023
See application file for complete search history.

(56) References Cited

FOREIGN PATENT DOCUMENTS

| | | | |
|---|---|---|---|
| CN | 103680443 | A | 3/2014 |
| CN | 113066446 | A | 7/2021 |
| CN | 113539163 | A | 10/2021 |
| CN | 114550630 | A | 5/2022 |
| CN | 115424583 | A | 12/2022 |
| KR | 10-2021-0144400 | A | 11/2021 |
| WO | 2020/073471 | A1 | 4/2020 |

* cited by examiner

CONDUCTION CONTROL CIRCUIT, DISPLAY PANEL AND DISPLAY DEVICE

CROSS-REFERENCE OF RELATED APPLICATIONS

This application is a National Stage of International Application No. PCT/CN2023/118094, filed on Sep. 11, 2023, which is hereby incorporated by reference in its entirety.

TECHNICAL FIELD

The present disclosure relates to the technical field of display, and in particular to a conduction control circuit, a display panel and a display device.

BACKGROUND

With the advent of the 5G era, display devices are bound to carry the terminal export of the Internet of Things. However, outdated and single display modes no longer meet people's needs. With the improvement of people's living standards, requirements for game display devices are becoming more and more stringent. At present, the regional high refresh rate technology will be the only choice compatible with high dynamic picture quality and lower data transmission rate. In order to realize the regional high refresh rate technology, it is necessary to add the partition design to the pixels in the display panel both in the column direction and in the row direction, which requires the addition of a large number of common signal lines, greatly occupies space, increases costs, and lacks ability to adjust intelligently.

SUMMARY

A conduction control circuit according to embodiments of the present disclosure includes:

- a gating control circuit, coupled to a first node, and configured to provide a signal of a first clock signal terminal to the first node in response to signals of a plurality of different gating control signal terminals;
- a control circuit, coupled to the first node and a second node, and configured to provide the signal of the first clock signal terminal or a signal of a first power supply terminal to the second node in response to a signal of the first node; and
- a conduction signal output circuit, coupled to the second node and a third node, and configured to provide a signal of a second clock signal terminal to a driving output terminal in response to a signal of the second node, and provide a signal of a first reference signal terminal to the driving output terminal in response to a signal of the third node.

In some possible embodiments, the gating control circuit includes: N gating control transistors;

- the N gating control transistors are in one-to-one correspondence with the plurality of different gating control signal terminals;
- a gate of an $n^{th}$ gating control transistor of the N gating control transistors is coupled to a gating control signal terminal corresponding to the $n^{th}$ gating control transistor;
- a first electrode of a $1^{st}$ gating control transistor of the N gating control transistors is coupled to the first clock signal terminal;
- a second electrode of the $N^{th}$ gating control transistor of the N gating control transistors is coupled to the first node; and
- the second electrode of the $n^{th}$ gating control transistor of the N gating control transistors is coupled to a first electrode of an $(n+1)^{th}$ gating control transistor of the N gating control transistors.

In some possible embodiments, the control circuit includes:

- a first control circuit, configured to provide the signal of the first clock signal terminal to the first node in response to a signal of a reset signal terminal; and
- a second control circuit, configured to provide the signal of the first clock signal terminal or the signal of the first power supply terminal to the second node in response to the signal of the first clock signal terminal and the signal of the first node.

In some possible embodiments, the first control circuit includes: a first transistor; where

- a gate of the first transistor is coupled to the reset signal terminal, a first electrode of the first transistor is coupled to the first node, and a second electrode of the first transistor is coupled to the first clock signal terminal.

In some possible embodiments, the second control circuit includes: a second transistor and a third transistor; where

- a gate of the second transistor is coupled to the first node, a first electrode of the second transistor is coupled to the first clock signal terminal or the first power supply terminal, and a second electrode of the second transistor is coupled to a first electrode of the third transistor; and
- a gate of the third transistor is coupled to the first clock signal terminal, and a second electrode of the third transistor is coupled to the second node.

In some possible embodiments, the second control circuit further includes: a first capacitor; where

- a first electrode of the first capacitor is coupled to the first power supply terminal, and a second electrode of the first capacitor is coupled to the first node.

In some possible embodiments, the conduction signal output circuit includes: a first conduction transistor, a second conduction transistor and a second capacitor; where

- a gate of the first conduction transistor is coupled to the second node, a first electrode of the first conduction transistor is coupled to the second clock signal terminal, and a second electrode of the first conduction transistor is coupled to the driving output terminal;
- a gate of the second conduction transistor is coupled to the third node, a first electrode of the second conduction transistor is coupled to the driving output terminal, and a second electrode of the second conduction transistor is coupled to the first reference signal terminal; and
- a first electrode of the second capacitor is coupled to the second node, and a second electrode of the second capacitor is coupled to the driving output terminal.

In some possible embodiments, the conduction control circuit further includes: a reset circuit, configured to provide a signal of a reset signal terminal or the signal of the first power supply terminal to the third node in response to the signal of the reset signal terminal.

In some possible embodiments, the reset circuit includes: a fourth transistor and a third capacitor; where

- a gate of the fourth transistor is coupled to the reset signal terminal, a first electrode of the fourth transistor is coupled to the reset signal terminal or the first power supply terminal, and a second electrode of the fourth transistor is coupled to the third node; and a first electrode of the third capacitor is coupled to the second electrode of the fourth transistor, and a second electrode of the third capacitor is coupled to the first reference signal terminal or a second reference signal terminal.

In some possible embodiments, the conduction control circuit further includes: a third control circuit, configured to control the signal of the third node in response to the signal of the first node and the signal of the third node.

In some possible embodiments, the third control circuit includes: a fifth transistor, a sixth transistor, and a seventh transistor; where a gate of the fifth transistor is coupled to the first node, a first electrode of the fifth transistor is coupled to the third node, and a second electrode of the fifth transistor is coupled to a reset signal terminal;

a gate of the sixth transistor is coupled to the second node, a first electrode of the sixth transistor is coupled to the third node, and a second electrode of the sixth transistor is coupled to the reset signal terminal; and a gate of the seventh transistor is coupled to the third node, a first electrode of the seventh transistor is coupled to the second node, and a second electrode of the seventh transistor is coupled to the first reference signal terminal.

In some possible embodiments, the conduction control circuit further includes: a fourth control circuit, configured to control the signal of the third node in response to the signal of the first node, the signal of the second node, and the signal of the third node.

In some possible embodiments, the fourth control circuit includes: an eighth transistor, a ninth transistor, a tenth transistor, and an eleventh transistor; where a gate of the eighth transistor is coupled to the first node, a first electrode of the eighth transistor is coupled to the third node, and a second electrode of the eighth transistor is coupled to a second electrode of the ninth transistor;

a gate of the ninth transistor is coupled to the third node, and a first electrode of the ninth transistor is coupled to the first power supply terminal;

a gate of the tenth transistor is coupled to the second node, a first electrode of the tenth transistor is coupled to a reset signal terminal, and a second electrode of the tenth transistor is coupled to the second electrode of the ninth transistor; and a gate of the eleventh transistor is coupled to the second node, a first electrode of the eleventh transistor is coupled to the second electrode of the tenth transistor, and a second electrode of the eleventh transistor is coupled to the third node.

In some possible embodiments, the conduction control circuit further includes: a fifth control circuit, configured to control the signal of the second node in response to the signal of the third node.

In some possible embodiments, the fifth control circuit includes: a twelfth transistor, a thirteenth transistor, a fourteenth transistor, and a fifteenth transistor; where a gate of the twelfth transistor is coupled to the third node, a first electrode of the twelfth transistor is coupled to a first electrode of a third transistor, and a second electrode of the twelfth transistor is coupled to a second electrode of the thirteenth transistor;

a gate of the thirteenth transistor is coupled to the second node, and a first electrode of the thirteenth transistor is coupled to the first power supply terminal;

a gate of the fourteenth transistor is coupled to the third node, a first electrode of the fourteenth transistor is coupled to a second reference signal terminal, and a second electrode of the fourteenth transistor is coupled to the second electrode of the thirteenth transistor; and a gate of the fifteenth transistor is coupled to the third node, a first electrode of the fifteenth transistor is coupled to the second electrode of the fourteenth transistor, and a second electrode of the fifteenth transistor is coupled to the second node.

In some possible embodiments, the conduction control circuit further includes: a sixth control circuit, configured to control the signal of the third node in response to the signal of the first node, the signal of the third node, and a signal of a second power supply terminal.

In some possible embodiments, the sixth control circuit includes: a sixteenth transistor, a seventeenth transistor, an eighteenth transistor, a nineteenth transistor, and a twentieth transistor; where a gate of the sixteenth transistor is coupled to the second node, a first electrode of the sixteenth transistor is coupled to a third reference signal terminal, and a second electrode of the sixteenth transistor is coupled to a first electrode of the seventeenth transistor;

a gate of the seventeenth transistor is coupled to the second power supply terminal, a second electrode of the seventeenth transistor is coupled to the second power supply terminal;

a gate of the eighteenth transistor is coupled to the first electrode of the seventeenth transistor, a first electrode of the eighteenth transistor is coupled to the third node, and a second electrode of the eighteenth transistor is coupled to the second power supply terminal;

a gate of the nineteenth transistor is coupled to the first node, a first electrode of the nineteenth transistor is coupled to the first electrode of the eighteenth transistor, and a second electrode of the nineteenth transistor is coupled to a second reference signal terminal; and a gate of the twentieth transistor is coupled to the second node, a first electrode of the twentieth transistor is coupled to the third node, and a second electrode of the twentieth transistor is coupled to the second reference signal terminal.

In some possible embodiments, the conduction control circuit further includes: a seventh control circuit, configured to control the signal of the second node in response to the signal of the second node, the signal of the third node, and a signal of a reset signal terminal.

In some possible embodiments, the seventh control circuit includes: a twenty-first transistor, a twenty-second transistor, a twenty-third transistor, a twenty-fourth transistor, and a twenty-fifth transistor; where a gate of the twenty-first transistor is coupled to the third node, a first electrode of the twenty-first transistor is coupled to a second reference signal terminal, and a second electrode of the twenty-first transistor is coupled to a first electrode of the twenty-second transistor;

a gate of the twenty-second transistor is coupled to the third node, and a second electrode of the twenty-second transistor is coupled to the second node;

a gate of the twenty-third transistor is coupled to the second node, a first electrode of the twenty-third transistor is coupled to the first power supply terminal, and a second electrode of the twenty-third transistor is coupled to the first electrode of the twenty-second transistor;

a gate of the twenty-fourth transistor is coupled to the reset signal terminal, a first electrode of the twenty-fourth transistor is coupled to the second reference signal terminal, and a second electrode of the twenty-fourth transistor is coupled to the first electrode of the twenty-second transistor; and a gate of the twenty-fifth transistor is coupled to the reset signal terminal, a first electrode of the twenty-fifth transistor is coupled to the second electrode of the twenty-fourth transistor, and a second electrode of the twenty-fifth transistor is coupled to the second node.

A display panel according to embodiments of the present disclosure includes: a display region and a non-display region;

where the display region includes: a plurality of sub-pixels, and each of the plurality of sub-pixels includes a pixel circuit;

the non-display region includes:

a timing controller, configured to provide a plurality of gating control signals;

a plurality of conduction control circuits above, coupled to the timing controller and the pixel circuit, where the plurality of gating control signal terminals are configured to receive the plurality of gating control signals, and the conduction control circuit is configured to provide a signal of the driving output terminal to the pixel circuit in response to the plurality of gating control signals provided by the timing controller.

In some possible embodiments, the display region further includes: a plurality of conduction signal lines, and pixel circuits in a column of sub-pixels are coupled to one of the plurality of conduction signal lines; and one of the plurality of conduction signal lines is coupled to the driving output terminal of one of the plurality of conduction control circuits.

In some possible embodiments, the non-display region further includes:

a data driving circuit, coupled to the pixel circuit and the timing controller, and configured to provide a data signal to the pixel circuit in response to a data signal output by the timing controller.

In some possible embodiments, the plurality of conduction control circuits are between the data driving circuit and the display region.

In some possible embodiments, the plurality of conduction control circuits are on a side of the display region away from the data driving circuit.

A display device according to embodiments of the present disclosure includes the above display panel.

DETAILED DESCRIPTION

Figure 1:
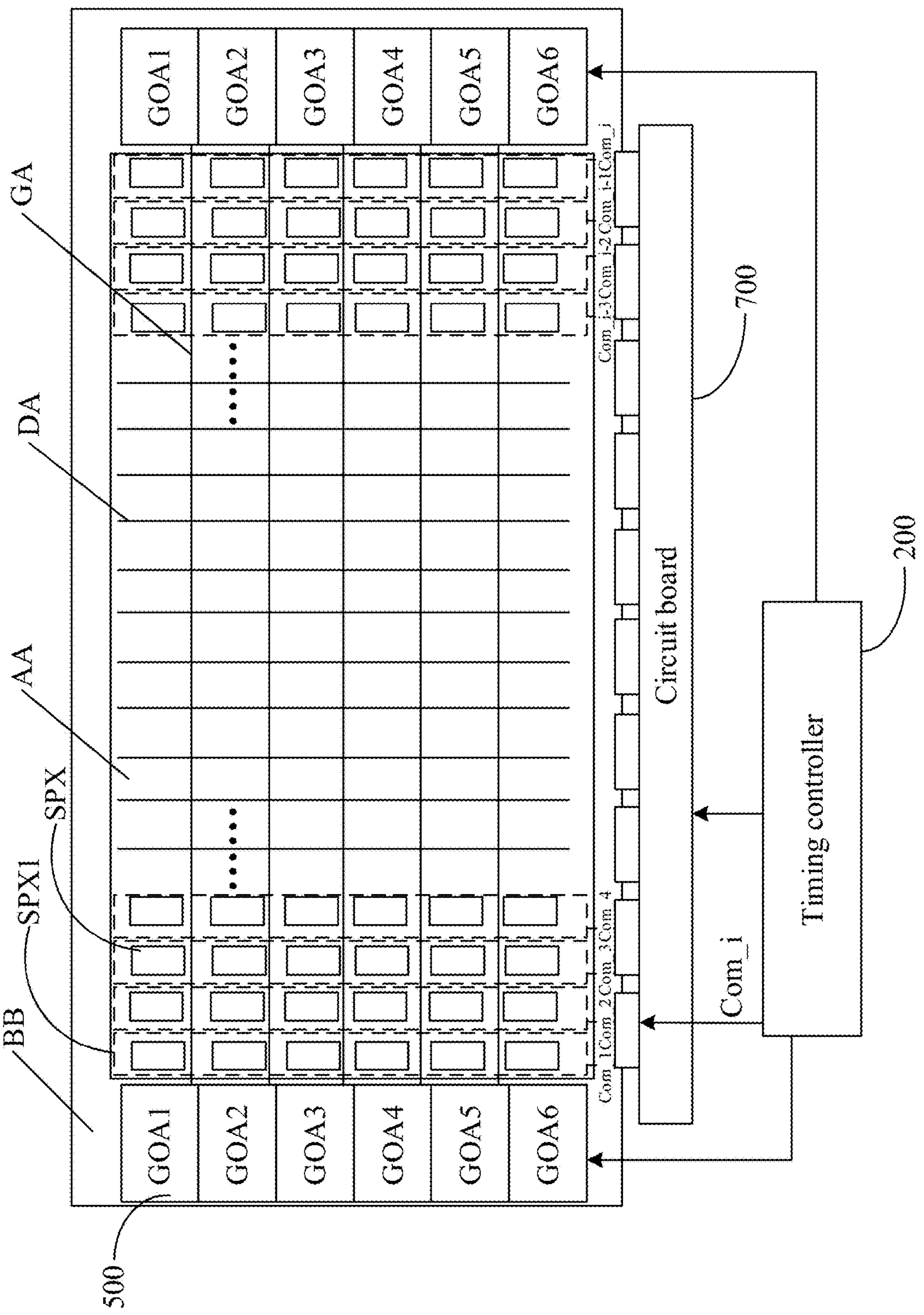
FIG. 1 is a structural schematic diagram of a display panel according to an embodiment of the present disclosure.

For making objectives, technical solutions and advantages of embodiments of the present disclosure clearer, technical solutions of embodiments of the present disclosure will be clearly and completely described below in conjunction with accompanying drawings in embodiments of the present disclosure. Apparently, embodiments described are some rather than all of embodiments of the present disclosure. Embodiments in the present disclosure and features of embodiments may be combined with each other without conflict. Based on embodiments of the present disclosure, all other embodiments obtained by those of ordinary skill in the art without making creative efforts fall within the scope of protection of the present disclosure.

Unless otherwise defined, technical or scientific terms used in the present disclosure should have ordinary meanings as understood by those of ordinary skill in the art to which the present disclosure belongs. The words “first”, “second” and the like used in the present disclosure do not indicate any order, quantity or importance, but are only used to distinguish different components. “Including”, “comprising”, and other similar words used in the present disclosure indicate that elements or objects before the word include elements or objects after the word and their equivalents, without excluding other elements or objects.

It should be noted that a size and a shape of each figure in the drawings do not reflect a true scale, but only for illustrating the present disclosure. Throughout the drawings, identical or similar reference numerals denote identical or similar elements or elements having identical or similar functions.

In some embodiments of the present disclosure, as shown in FIG. 1, the display panel may include a display region AA and a non-display region BB. The display region AA may include a plurality of pixels. Each pixel includes a plurality of sub-pixels SPX. Illustratively, the pixel may include red, green, and blue sub-pixels. In this way, color can be mixed by red, green and blue to realize color display. Alternatively, the pixel may also include red, green, blue, and white sub-pixels. In this way, color can be mixed by red, green, blue and white to realize color display. Of course, in the actual application, the luminescent color(s) of the sub-pixel (s) in the pixel can be designed and determined according to the actual application environment, and is not limit herein.

In some embodiments of the present disclosure, as shown in FIG. 1, the display region AA may include a plurality of gate lines GA and a plurality of data lines DA. A transistor(s) and a pixel electrode(s) may be included in each sub-pixel. In the display panel, the normal display in the display region AA is commonly controlled by the gate lines GA and the data lines DA. The gate lines GA are used for transmitting scan signals for controlling on/off of the transistors in the pixel. The data lines DA transmit data signals required for pixel display. One row of sub-pixels SPX1 corresponds to one gate line GA, and one column of sub-pixels SPX1 corresponds to one data line DA. A gate of the transistor is coupled to a corresponding gate line, a first electrode of the transistor is coupled to a corresponding data line, and a second electrode of the transistor is coupled to the pixel electrode. It should be noted that the structure of the pixel of the present disclosure may also be a double-gate structure, that is, two gate lines are arranged between two adjacent rows of sub-pixels SPX. This arrangement can reduce half of the data lines, namely there are data lines between some adjacent two columns of the sub-pixels SPX, and there are no data lines between some other adjacent two columns of sub-pixels SPX. The specific arrangement structure of sub-pixels, and the arrangement of data lines and gate lines are not limited herein.

In some embodiments of the present disclosure, as shown in FIG. 1, in the Gate Driver on Array (GOA), a gate driving circuit 500 is integrated on an array substrate of a display panel to realize a progressive scanning driving manner, saving the gate driving circuit part, having advantages of reducing the production cost and realizing the narrow frame design of the panel, and being used by a variety of displays. A gate driving circuit 500 and a data driving circuit (on a circuit board in FIG. 1) may be included in the non-display region BB. The gate driving circuit(s) 500 is coupled to each of the gate lines GA, and the data driving circuit(s) is coupled to each of the data lines DA. In addition, the timing controller may be coupled to the gate driving circuit 500 and the data driving circuit (on the circuit board in FIG. 1). The gate driving circuit 500 is generally disposed in the non-display region BB on the left or right side of the display panel. Illustratively, the timing controller 200 may acquire display data of a picture to be displayed in a current display frame, and the timing controller 200 may input a control signal to the gate driving circuit 500, so that the gate driving circuit 500 can output a gate scanning signal to each gate line according to the input control signal, to drive each gate line to control transistors in sub-pixels coupled to the gate line to be turned on. Furthermore, the timing controller 200 inputs the acquired display data to the data driving circuit, so that the data driving circuit can input data signals to data lines DA coupled to the data driving circuit according to the input display data. Therefore, the voltage on the data line DA is input into the sub-pixel through the turned-on transistor to charge the sub-pixel SPX, and then each sub-pixel SPX is charged with a corresponding data signal to realize the picture display function.

Illustratively, as shown in FIG. 1, in order to implement the regional high refresh rate technology, it is necessary to add the partition design to the sub-pixels SPX both in the column direction and in the row direction. For example, the gate driving circuit 500 is divided into six regions (GOA1, GOA2, GOA3, GOA4, GOA5, and GOA6 in FIG. 1). The sub-pixels SPX are divided into i column regions, and each column of the sub-pixels SPX1 needs to be controlled by a signal of the timing controller through a common signal line (e.g., Com_1, Com_2, Com_3, Com_4, Com_i−3, Com_i−2, Com_i−1, or Com_i in FIG. 1). For example, if the sub-pixels SPX are divided into 4096 column regions, 4096 common signal lines are required. It can be seen that a large number of common signal lines need to be added, greatly occupying space, increasing costs, and lacking ability to adjust pixels intelligently.

Figure 2:
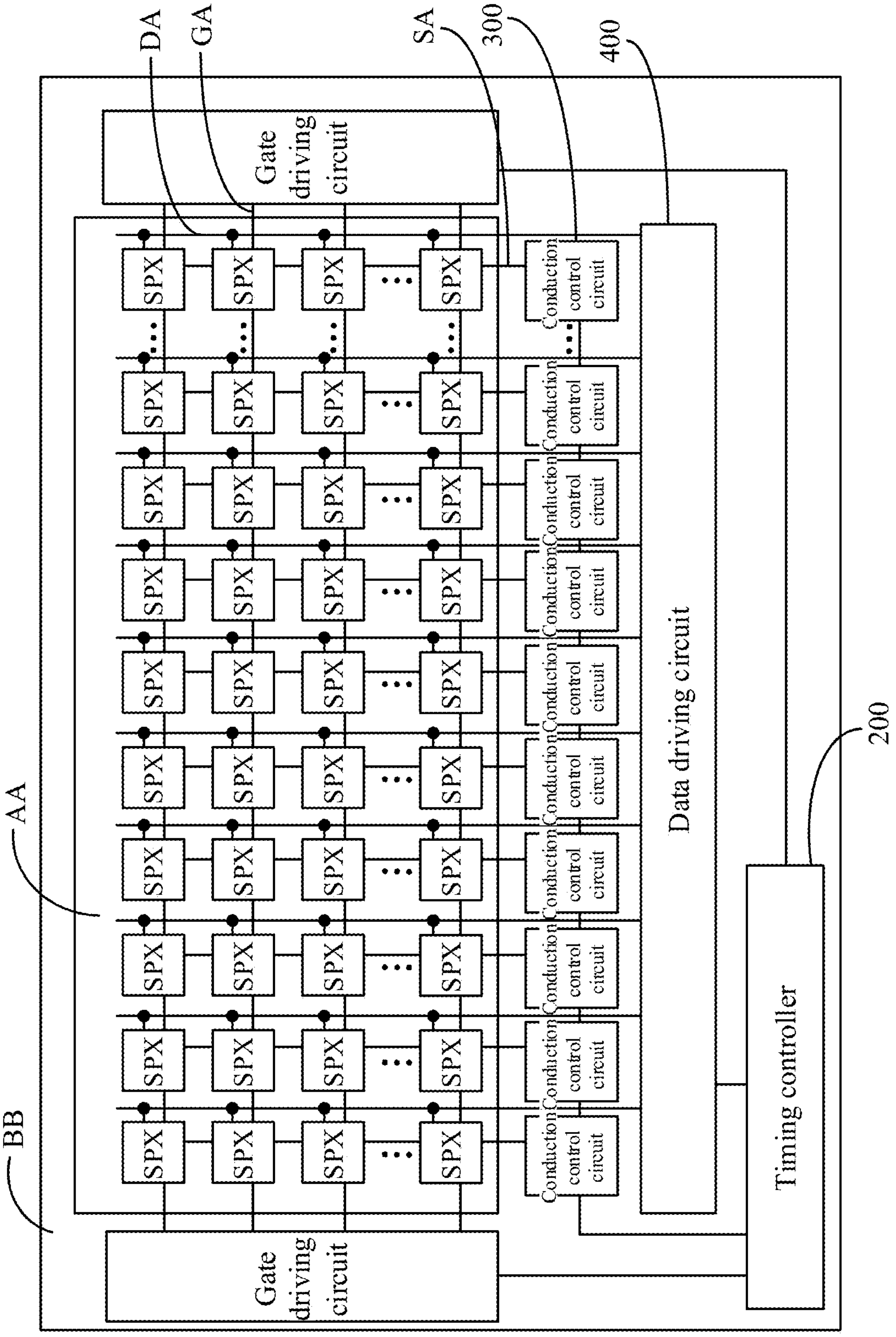
FIG. 2 is another structural schematic diagram of a display panel according to an embodiment of the present disclosure.

Based on the above problems, the display panel according to embodiments of the present disclosure, as shown in FIG. 2, includes:

- a display region AA including: a plurality of sub-pixels SPX, and each of the plurality of sub-pixels SPX includes a pixel circuit 100;
- a non-display region BB including:
- a timing controller 200, configured to provide a plurality of gating control signals;
- a plurality of conduction control circuits 300, coupled to the timing controller 200 and the pixel circuit 100, where the plurality of gating control signal terminals are configured to receive a plurality of gating control signals, the conduction control circuit 300 is configured to provide a signal of a driving output terminal OT to the pixel circuit 100 in response to the plurality of gating control signals provided by the timing controller 100.

In the present disclosure, by arranging a plurality of gating control signal terminals to receive a plurality of gating control signals, the conduction control circuit provides the signal of the driving output terminal to the pixel circuit in response to the plurality of gating control signals provided by the timing controller. In this arrangement, the pixel circuit can be controlled to operate by controlling the gating control signals of the conduction control circuit, to flexibly control the number of sub-pixel partitions and further greatly reduce the number of signals required by the pixel circuit to operate, which saves the space occupied by the signal lines, reduces the cost, and also has the ability to adjust intelligently.

Figure 3:
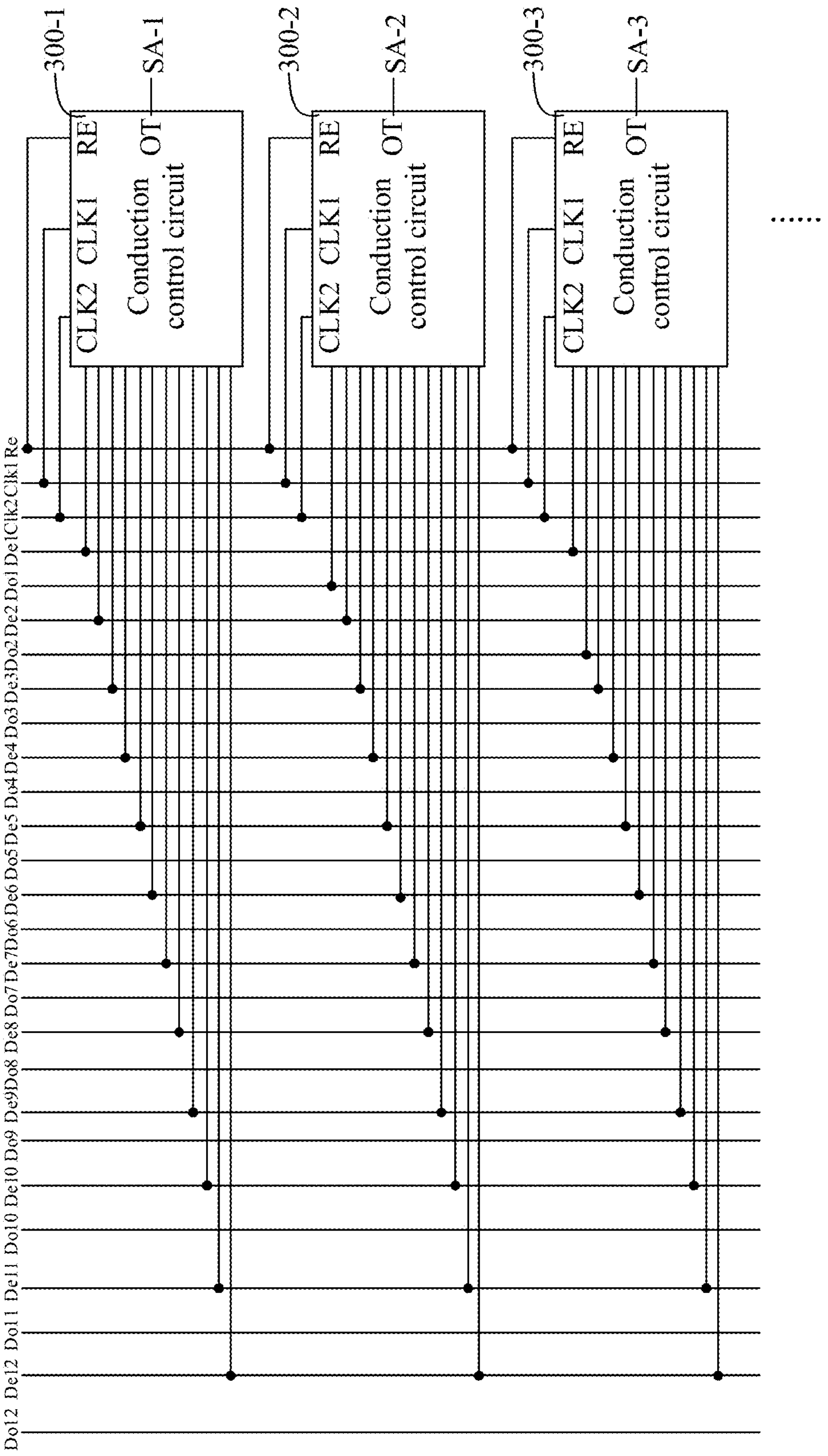
FIG. 3 is another structural schematic diagram of a display panel according to an embodiment of the present disclosure.

In some embodiments of the present disclosure, as shown in FIG. 2 and FIG. 3, the display region AA further includes a plurality of conduction signal lines (e.g., SA in FIG. 2). Pixel circuits 100 in a column of sub-pixels SPX are coupled to one of the conduction signal lines (e.g., SA in FIG. 2). One of the conduction signal lines (e.g., SA-1, SA-2, SA-3 in FIG. 3) is coupled to the driving output terminal OT of one of the conduction control circuits (e.g., 300-1, 300-2, 300-3 in FIG. 3).

In some embodiments of the present disclosure, as shown in FIG. 2, the non-display region BB further includes a data driving circuit 400, coupled to the pixel circuit 100 and the timing controller 200, and configured to provide a data signal to the pixel circuit 100 in response to a data signal output by the timing controller 200.

In some embodiments of the present disclosure, as shown in FIG. 2, the plurality of conduction control circuits 300 are between the data driving circuit 400 and the display region AA.

Figure 4:
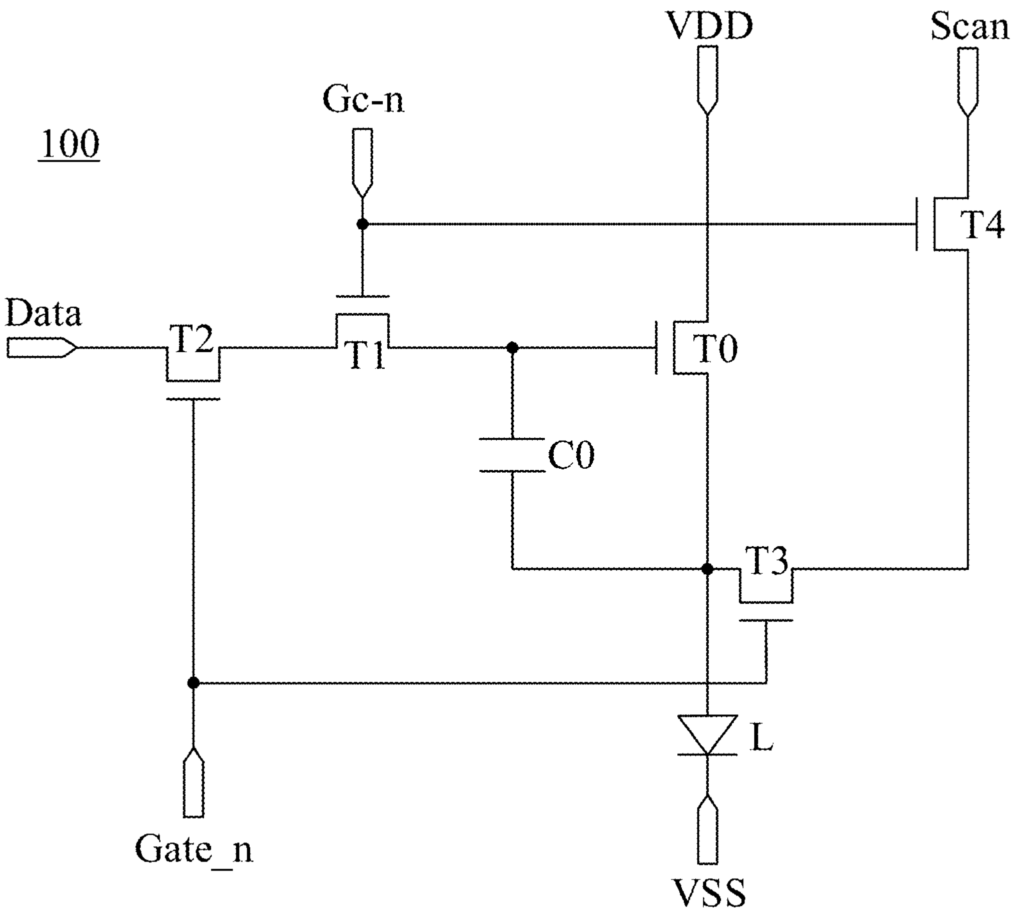
FIG. 4 is a structural schematic diagram of a pixel circuit according to an embodiment of the present disclosure.

Illustratively, a structure of the pixel circuit shown in FIG. 4 includes: a driving transistor T0, a light emitting device L, a first switching transistor T1, a second switching transistor T2, a third switching transistor T3, a fourth switching transistor T4 and a voltage stabilization capacitor C0. A gate of the driving transistor T0 is coupled to a second electrode of the first switching transistor T1, a first electrode of the driving transistor T0 is coupled to a first power supply voltage terminal VDD, and a second electrode of the driving transistor T0 is coupled to the light emitting device L. A gate of the first switching transistor T1 is coupled to a conduction control signal terminal Gc-n, a first electrode of the first switching transistor T1 is coupled to a second electrode of the second switching transistor T2. A gate of the second switch transistor T2 is coupled to a gate scan signal terminal Gate_n, a first electrode of the second switching transistor T2 is coupled to a data signal terminal Data. A gate of the third switch transistor T3 is coupled to the gate scan signal terminal Gate_n, a first electrode of the third switching transistor T3 is coupled to a second electrode of the voltage stabilization capacitor C0, and a second electrode of the third switching transistor T3 is coupled to a second electrode of the fourth switching transistor T4. A gate of the fourth switching transistor T4 is coupled to the conduction control signal terminal Gc-n, and a first electrode of the fourth switching transistor T4 is coupled to the scan signal terminal Scan. A first electrode of the voltage stabilization capacitor C0 is coupled to the gate of the driving transistor T0. In embodiments of the present disclosure, a first electrode of the light emitting device L may be an anode, and a second electrode of the light emitting device L may be a cathode. Illustratively, the light emitting device L may be an organic light emitting diode. For example, the light emitting device L may include at least one of a Micro Light Emitting Diode (Micro LED), an Organic Light Emitting Diode (OLED) or a Quantum Dot Light Emitting Diodes (QLED). Illustratively, the light emitting device L may include an anode, a light emitting layer, and a cathode stacked. Further, the light emitting layer may further include a hole injection layer, a hole transport layer, an electron transport layer, an electron injection layer, and other film layers. In a practical application, the specific structure of the light emitting device L may be designed and determined according to the practical application environment, which is not limited herein.

Illustratively, the first electrode of the above transistor may be a source, and the second electrode of the above transistor may be a drain. Alternatively, the first electrode of the above transistor is a drain and the second electrode of the above transistor is a source, which is not limited herein.

Generally, the transistor using a Low Temperature Poly-Silicon (LTPS) material as an active layer of the transistor has high mobility and can be made thinner and smaller, and has lower power consumption, etc. In an implementation, the material of the active layer of at least one transistor may be a low temperature poly-silicon material. The above-mentioned transistor can thus be arranged as a transistor of the LTPS type, so that the pixel circuit achieves high mobility and can be made thinner and smaller, and has lower power consumption, and the like.

Generally, the transistor with a metal oxide semiconductor material as an active layer of the transistor has small leakage current, so in order to reduce the leakage current, in some embodiments of the present disclosure, the material of the active layer of at least one transistor may also include a metal oxide semiconductor material, for example, IGZO (Indium Gallium Zinc Oxide). Of course, other metal oxide semiconductor materials may also be used, which is not limited herein. The above-mentioned transistor can thus be arranged as an Oxide Thin Film Transistor, so that the leakage current of the pixel circuit is reduced.

Illustratively, all of the transistors may be LTPS type transistors. Alternatively, all of the transistors may be oxide type transistors. Alternatively, some of the transistors may be oxide type transistors and the remaining transistors may be LTPS type transistors.

Figure 5:
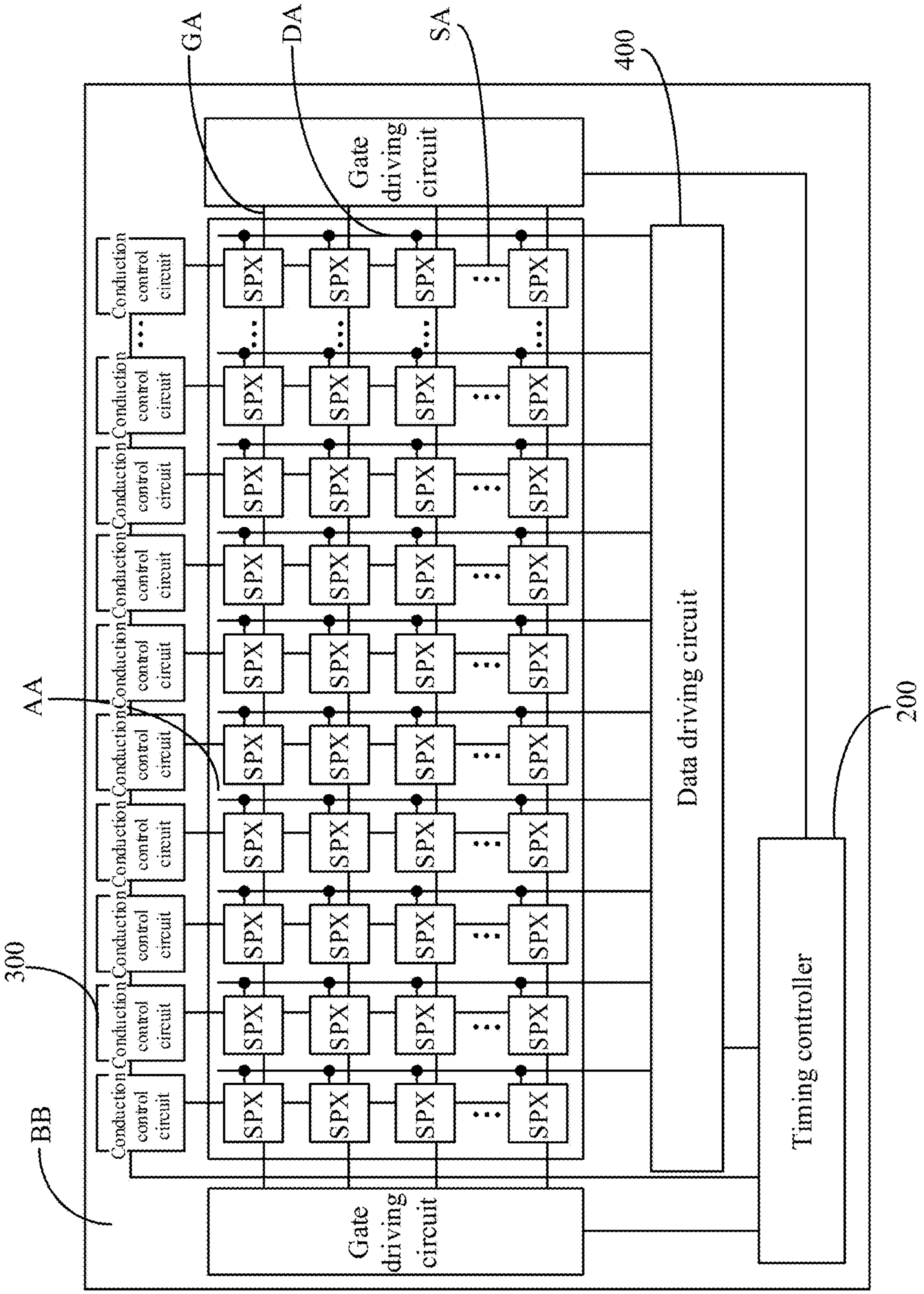
FIG. 5 is another structural schematic diagram of a display panel according to an embodiment of the present disclosure.

Embodiments of the present disclosure provide another structural schematic diagram of a display panel. As shown in FIG. 5, FIG. 5 is a variation of embodiments described above. Only differences between this embodiment and the above embodiments will be described below, and similarities will not be repeated here.

As shown in FIG. 5, in some embodiment of the present disclosure, a plurality of conduction control circuit 300 are on a side of the display region AA away from the data driving circuit 400.

The conduction control circuit is on a side of the circuit board, which ensures that the bezel near the side of the circuit board is not affected.

Figure 6:
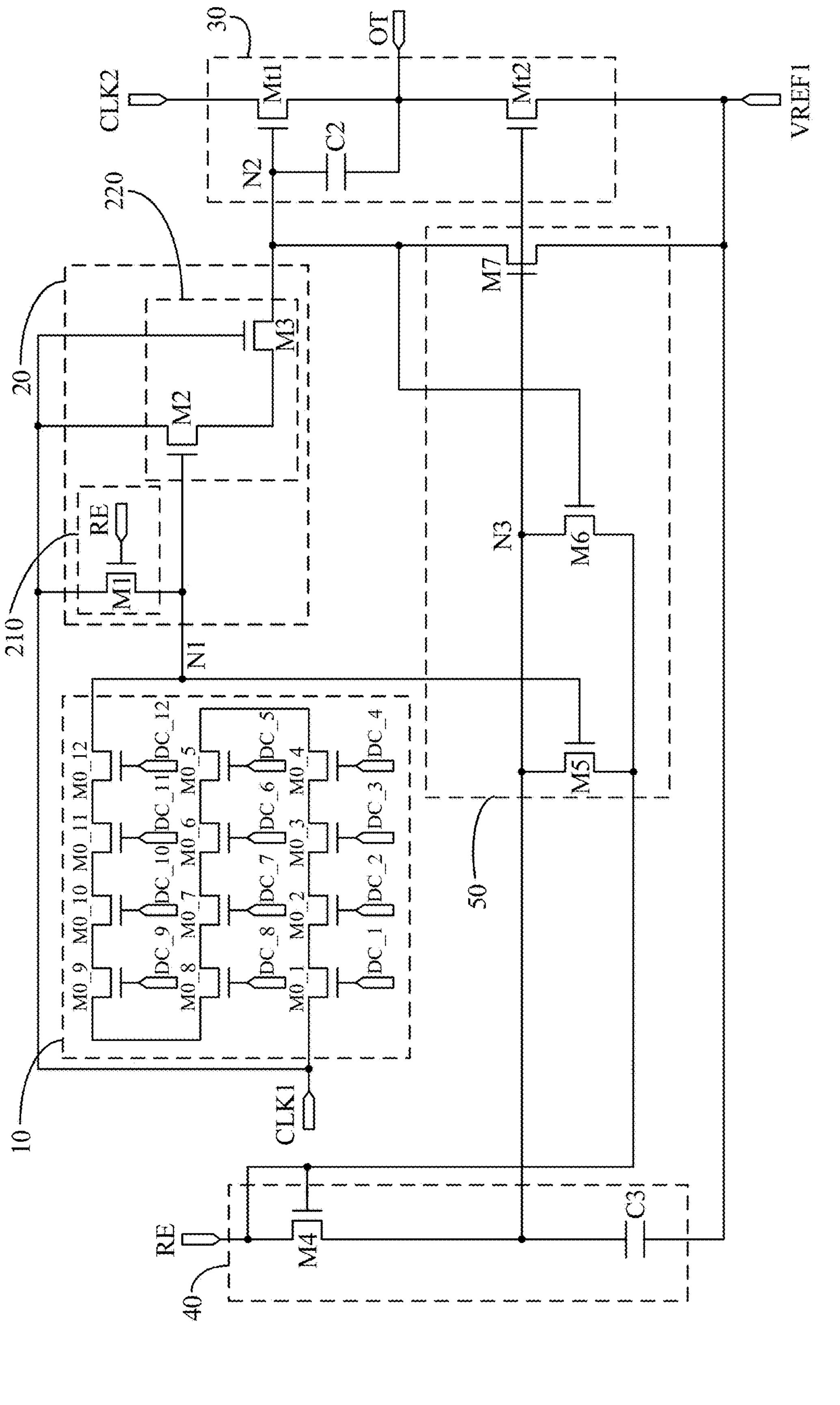
FIG. 6 is a structural schematic diagram of a conduction control circuit according to an embodiment of the present disclosure.

As shown in FIG. 6, the conduction control circuit according to embodiments of the present disclosure includes:

a gating control circuit 10, coupled to a first node N1, and configured to provide a signal of a first clock signal terminal CLK1 to the first node N1 in response to signals of a plurality of different gating control signal terminals;

a control circuit 20, coupled to the first node N1 and a second node N2, and configured to provide the signal of the first clock signal terminal CLK1 or a signal of a first power supply terminal VDD1 to the second node N2 in response to a signal of the first node N1; and;

a conduction signal output circuit 30, coupled to the second node N2 and a third node N3, and configured to provide a signal of a second clock signal terminal CLK2 to a driving output terminal OT in response to a signal of the second node N2, and provide a signal of a first reference signal terminal VRFF1 to the driving output terminal OT in response to a signal of the third node N3.

In embodiments of the present disclosure, the signal of the driving output terminal is controlled through the mutual cooperation of the gating control circuit, the control circuit and the conduction signal output circuit. In addition, signals of a plurality of different gating control signal terminals are controlled, and the signal of the first clock signal terminal is provided to the first node, that is, the gating control circuit is controlled to operate through controlling the signals of a plurality of different gating control signal terminals. This arrangement can save the space occupied by the signal lines and reduce the cost.

In some embodiments of the present disclosure, the gating control circuit includes N gating control transistors. The N gating control transistors are in one-to-one correspondence with the plurality of different gating control signal terminals. A gate of an $n^{th}$ gating control transistor of the N gating control transistors is coupled to a gating control signal terminal corresponding to the $n^{th}$ gating control transistor. A first electrode of a $1^{st}$ gating control transistor of the N gating control transistors is coupled to the first clock signal terminal. A second electrode of the $N^{th}$ gating control transistor of the N gating control transistors is coupled to the first node. The second electrode of the $N^{th}$ gating control transistor of the N gating control transistors is coupled to a first electrode of an $(n+1)^{th}$ gating control transistor of the N gating control transistors.

Illustratively, the gating control transistor may be turned on under control of an active level of a gating control signal transmitted by the gating control signal terminal, and may be turned off under control of an inactive level of the gating control signal. Illustratively, if the gating control transistor is a P-type transistor, the active level of the gating control signal is a low level, and the inactive level of the strobe control signal is a high level. Alternatively, the gating control transistor is an N-type transistor, the active level of the gating control signal is a high level, and the inactive level of the gating control signal is a low level.

For example, as shown in FIG. 6, N=12 is taken as an example for illustration. The gating control circuit 10 includes 12 gating control transistors. A gate of a first gating control transistor M0_1 is coupled to a corresponding gating control signal terminal DC_1, a first electrode of the first gating control transistor M0_1 is coupled to a first clock signal terminal CLK1, and a second electrode of the first gating control transistor M0_1 is coupled to a first electrode of a second gating control transistor M0_2. A gate of the second gating control transistor M0_2 is coupled to a corresponding gating control signal terminal DC_2, and a second electrode of the second gating control transistor M0_2 is coupled to a first electrode of a third gating control transistor M0_3. A gate of the third gating control transistor M0_3 is coupled to a corresponding gating control signal terminal DC_3, and a second electrode of the third gating control transistor M0_3 is coupled to a first electrode of a fourth gating control transistor M0_4. A gate of the fourth gating control transistor M0_4 is coupled to a corresponding gating control signal terminal DC_4, and a second electrode of the fourth gating control transistor M0_4 is coupled to a first electrode of a fifth gating control transistor M0_5. A gate of the fifth gating control transistor M0_5 is coupled to a corresponding gating control signal terminal DC_5, and a second electrode of the fifth gating control transistor M0_5 is coupled to a first electrode of a sixth gating control transistor M0_6. A gate of the sixth gating control transistor M0_6 is coupled to a corresponding gating control signal terminal DC_6, and a second electrode of the sixth gating control transistor M0_6 is coupled to a first electrode of a seventh gating control transistor M0_7. A gate of the seventh gating control transistor M0_7 is coupled to a corresponding gating control signal terminal DC_7, and a second electrode of the seventh gating control transistor M0_7 is coupled to a first electrode of an eighth gating control transistor M0_8. A gate of the eighth gating control transistor M0_8 is coupled to a corresponding gating control signal terminal DC_8, and a second electrode of the eighth gating control transistor M0_8 is coupled to a first electrode of a ninth gating control transistor M0_9. A gate of the ninth gating control transistor M0_9 is coupled to a corresponding gating control signal terminal DC_9, and a second electrode of the ninth gating control transistor M0_9 is coupled to a first electrode of a tenth gating control transistor M0_10. A gate of the tenth gating control transistor M0_10 is coupled to a corresponding gating control signal terminal DC_10, and a second electrode of the tenth gating control transistor M0_10 is coupled to a first electrode of a eleventh gating control transistor M0_11. A gate of the eleventh gating control transistor M0_11 is coupled to a corresponding gating control signal terminal DC_11, and a second electrode of the eleventh gating control transistor M0_11 is coupled to a first electrode of a twelfth gating control transistor M0_12. A gate of the twelfth gating control transistor M0_12 is coupled to a corresponding gating control signal terminal DC_12, and a second electrode of the twelfth gating control transistor M0_12 is coupled to the first node N1.

Illustratively, as shown in FIG. 3, the display panel further includes a reset signal line Re, a first clock signal line Clk1, a second clock signal line Clk2, and a plurality of first gating signal lines Do1-Do12, a plurality of second gating signal lines De1-De12. A reset signal terminal RE is coupled to the timing controller through the reset signal line Re. The first clock signal terminal CLK1 is coupled to the timing controller through the first clock signal line Clk1. The second clock signal terminal CLK2 is coupled to the timing controller through the second clock signal line Clk2. The gating control signal terminal DC_1 is coupled to the timing controller through the first gating signal line Do1 or the second gating signal line De1. The gating control signal terminal DC_2 is coupled to the timing controller through the first gating signal line Do2 or the second gating signal line De2. The gating control signal terminal DC_3 is coupled to the timing controller through the first gating signal line Do3 or the second gating signal line De3. The gating control signal terminal DC_4 is coupled to the timing controller through the first gating signal line Do4 or the second gating signal line De4. The gating control signal terminal DC_5 is coupled to the timing controller through the first gating signal line Do5 or the second gating signal line De5. The gating control signal terminal DC_6 is coupled to the timing controller through the first gating signal line Do6 or the second gating signal line De6. The gating control signal terminal DC_7 is coupled to the timing controller through the first gating signal line Do7 or the second gating signal line De7. The gating control signal terminal DC_8 is coupled to the timing controller through the first gating signal line Do8 or the second gating signal line De8. The gating control signal terminal DC_9 is coupled to the timing controller through the first gating signal line Do9 or the second gating signal line De9. The gating control signal terminal DC_10 is coupled to the timing controller through the first gating signal line Do10 or the second gating signal line De10. The gating control signal terminal DC_11 is coupled to the timing controller through the first gating signal line Do11 or the second gating signal line De11. The gating control signal terminal DC_12 is coupled to the timing controller through the first gating signal line Do12 or the second gating signal line De12.

Since each gating control signal terminal in the conduction control circuit may be coupled to the first gating signal line or the second gating signal line, that is, each gating control signal terminal has two coupling modes. When there are 12 gating control signal terminals in the conduction control circuit, the conduction control circuit has $2^{12}$ (i.e., 4096) coupling modes. Furthermore, because one conduction control circuit corresponds to one column of sub-pixels, when there are 12 gating control signal terminals in the conduction control circuit, 4096 columns of sub-pixels correspond to conduction control circuits. It can be seen that the timing controller only needs to provide gating control signals for the 12 first gating signal lines and the 12 second gating signal lines, so that light emission of each column of sub-pixels can be controlled by the conduction control circuit, that is, the number of signal lines is reduced, so that the space is saved, and the cost is further reduced. In addition, since the coupling modes of the conduction control circuits are not completely the same, the ability to adjust intelligently can be provided.

In some embodiments of the present disclosure, as shown in FIG. 6, the control circuit 20 includes:

- a first control circuit 210, configured to provide the signal of the first clock signal terminal CLK1 to the first node N1 in response to a signal of a reset signal terminal RE;
- a second control circuit 220, configured to provide the signal of the first clock signal terminal CLK1 or the signal of the first power supply terminal VDD1 to the second node N2 in response to the signal of the first clock signal terminal CLK1 and the signal of the first node N1.

In some embodiments of the present disclosure, as shown in FIG. 6, the first control circuit 210 includes a first transistor M1. A gate of the first transistor M1 is coupled to the reset signal terminal RE, a first electrode of the first transistor M1 is coupled to the first node N1, and a second electrode of the first transistor M1 is coupled to the first clock signal terminal CLK1.

For example, the first transistor may be turned on under control of an active level of a reset signal transmitted by the reset signal terminal, and may be turned off under control of an inactive level of the reset signal. Illustratively, if the first transistor is a P-type transistor, then the active level of the reset signal is a low level, and the inactive level of the reset signal is a high level. Alternatively, if the first transistor is an N-type transistor, then the active level of the reset signal is a high level, and the inactive level of the reset signal is a low level.

In some embodiments of the present disclosure, as shown in FIG. 6, the second control circuit 220 includes a second transistor M2 and a third transistor M3. A gate of the second transistor M2 is coupled to the first node N1, a first electrode of the second transistor M2 is coupled to the first clock signal terminal CLK1 or the first power supply terminal VDD1, and a second electrode of the second transistor M2 is coupled to a first electrode of the third transistor M3. A gate of the third transistor M3 is coupled to the first clock signal terminal CLK1, and a second electrode of the third transistor M3 is coupled to the second node N2.

Illustratively, the second transistor may be turned on under control of an active level of a signal transmitted on the first node, and may be turned off under control of an inactive level of the signal transmitted on the first node. For example, if the second transistor is a P-type transistor, then the active level of the signal transmitted on the first node is a low level, and the inactive level of the signal transmitted on the first node is a high level. Alternatively, if the second transistor is an N-type transistor, then the active level of the signal transmitted on the first node is a high level, and the inactive level of the signal transmitted on the first node is low.

Illustratively, the third transistor may be turned on under control of an active level of the first clock signal transmitted by the first clock signal terminal, and may be turned off under control of an inactive level of the first clock signal. For example, if the third transistor is a P-type transistor, then the active level of the first clock signal is a low level, and the inactive level of the first clock signal is a high level. Alternatively, if the third transistor is an N-type transistor, the active level of the first clock signal is a high level, and the inactive level of the first clock signal is a low level.

As shown in FIG. 6, in some embodiment of the present disclosure, the conduction signal output circuit 30 includes a first conduction transistor Mt1, a second conduction transistor Mt2, and a second capacitor C2. A gate of the first conduction transistor Mt1 is coupled to the second node N2, a first electrode of the first conduction transistor Mt1 is coupled to the second clock signal terminal CLK2, and a second electrode of the first conduction transistor Mt1 is coupled to the driving output terminal OT. A gate of the second conduction transistor Mt2 is coupled to the third node N3, a first electrode of the second conduction transistor Mt2 is coupled to the driving output terminal OT, and a second electrode of the second conduction transistor Mt2 is coupled to the first reference signal terminal VREF1. A first electrode of the second capacitor C2 is coupled to the second node N2, and a second electrode of the second capacitor C2 is coupled to the driving output terminal OT.

Illustratively, the first conduction transistor may be turned on under control of an active level of a signal transmitted on the second node, and may be turned off under control of an inactive level of the signal transmitted on the second node. For example, if the first conduction transistor is a P-type transistor, then the active level of the signal transmitted on the second node is a low level, and the inactive level of the signal transmitted on the second node is a high level. Alternatively, if the first conduction transistor is an N-type transistor, then the active level of the signal transmitted on the second node is a high level, and the inactive level of the signal transmitted on the second node is a low level.

Illustratively, the second conduction transistor may be turned on under control of an active level of a signal transmitted on the third node, and may be turned off under control of an inactive level of the signal transmitted on the third node. For example, if the second conduction transistor is a P-type transistor, then the active level of the signal transmitted on the third node is a low level, and the inactive level of the signal transmitted on the third node is a high level. Alternatively, if the second conduction transistor is an N-type transistor, then the active level of the signal transmitted on the third node is a high level, and the inactive level of the signal transmitted on the third node is a low level.

In some embodiments of the present disclosure, as shown in FIG. 6, the conduction control circuit further includes a reset circuit 40 configured to provide a signal of a reset signal terminal RE to the third node N3 in response to the signal of the reset signal terminal RE.

In some embodiments of the present disclosure, as shown in FIG. 6, the reset circuit 40 includes a fourth transistor M4 and a third capacitor C3. A gate of the fourth transistor M4 is coupled to the reset signal terminal RE, a first electrode of the fourth transistor M4 is coupled to the reset signal terminal RE, and a second electrode of the fourth transistor M4 is coupled to the third node N3. A first electrode of the third capacitor C3 is coupled to the second electrode of the fourth transistor M4, and a second electrode of the third capacitor C3 is coupled to the first reference signal terminal VREF1.

Illustratively, the fourth transistor may be turned on under control of the active level of the reset signal transmitted by the reset signal terminal, and may be turned off under control of the inactive level of the reset signal. For example, if the fourth transistor is a P-type transistor, then the active level of the reset signal is a low level, and the inactive level of the reset signal is a high level. Alternatively, if the fourth transistor is an N-type transistor, then the active level of the reset signal is a high level, and the inactive level of the reset signal is a low level.

In some embodiments of the present disclosure, as shown in FIG. 6, conduction control circuit further includes a third control circuit 50 configured to control the signal of the third node N3 in response to the signal of the first node N1 and the signal of the third node N3.

As shown in FIG. 6, in some embodiment of the present disclosure, the third control circuit 50 includes a fifth transistor M5, a sixth transistor M6, and a seventh transistor M7. A gate of the fifth transistor M5 is coupled to the first node N1, a first electrode of the fifth transistor M5 is coupled to the third node N3, and a second electrode of the fifth transistor M5 is coupled to the reset signal terminal RE. A gate of the sixth transistor M6 is coupled to the second node N2, a first electrode of the sixth transistor M6 is coupled to the third node N3, and a second electrode of the sixth transistor M6 is coupled to the reset signal terminal RE. A gate of the seventh transistor M7 is coupled to the third node N3, a first electrode of the seventh transistor M7 is coupled to the second node N2, and a second electrode of the seventh transistor M7 is coupled to the first reference signal terminal VREF1.

Illustratively, the fifth transistor may be turned on under control of the active level of the signal transmitted on the first node, and may be turned off under control of the inactive level of the signal transmitted on the first node. For example, if the fifth transistor is a P-type transistor, then the active level of the signal transmitted on the first node is a low level, and the inactive level of the signal transmitted on the first node is a high level. Alternatively, if the fifth transistor is an N-type transistor, then the active level of the signal transmitted on the first node is a high level, and the inactive level of the signal transmitted on the first node is a low level.

Illustratively, the sixth transistor may be turned on under control of the active level of the signal transmitted on the second node, and may be turned off under control of the inactive level of the signal transmitted on the second node. For example, if the sixth transistor is a P-type transistor, then the active level of the signal transmitted on the second node is a low level, and the inactive level of the signal transmitted on the second node is a high level. Alternatively, if the sixth transistor is an N-type transistor, then the active level of the signal transmitted on the second node is a high level, and the inactive level of the signal transmitted on the second node is a low level.

Illustratively, the seventh transistor may be turned on under control of the active level of the signal transmitted on the third node, and may be turned off under control of the inactive level of the signal transmitted on the third node. For example, if the seventh transistor is a P-type transistor, then the active level of the signal transmitted on the third node is a low level, and the inactive level of the signal transmitted on the third node is a high level. Alternatively, if the seventh transistor is an N-type transistor, then the active level of the signal transmitted on the third node is a high level, and the inactive level of the signal transmitted on the third node is a low level.

Illustratively, the first electrode of the above transistor may be a source, and the second electrode of the above transistor may be a drain. Alternatively, the first electrode of the above transistor is a drain and the second electrode of the above transistor is a source, which is not limited herein.

It should be noted that the transistor mentioned in embodiments of the present disclosure may be a Thin Film Transistor (TFT), and may also be a Metal Oxide Semiconductor (MOS) field effect transistor, which is not limited herein.

Figure 7:
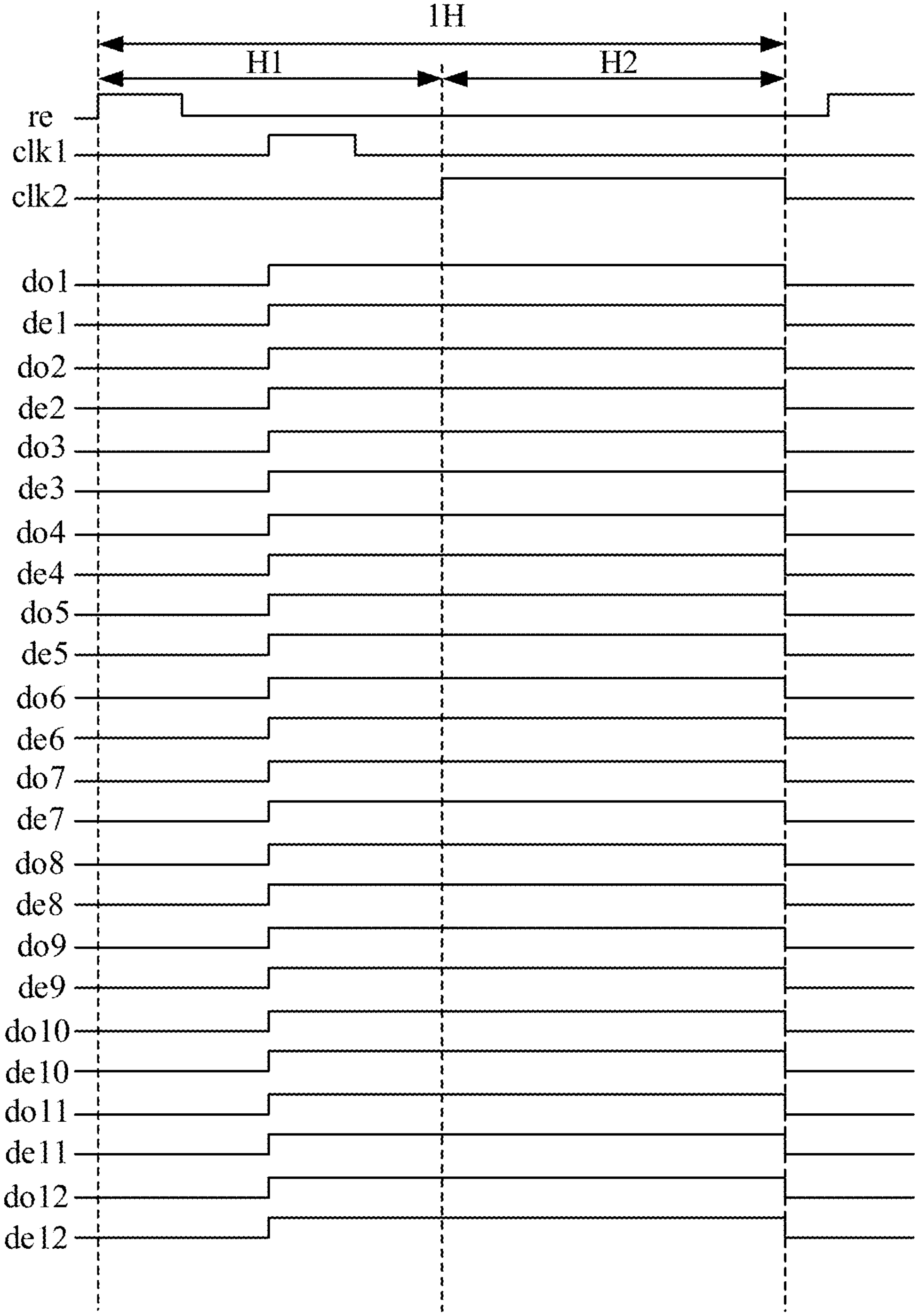
FIG. 7 is a timing diagram of signals according to an embodiment of the present disclosure.

Taking the conduction control circuit shown in FIG. 6 as an example, with reference to the structural diagrams of the display panel shown in FIGS. 2 and 3 and the timing diagram of signals shown in FIG. 7, the working process of the conduction control circuit according to embodiments of the present disclosure is described.

In embodiments of the present disclosure, as shown in FIG. 7, re represents the reset signal of the reset signal terminal RE, Clk1 represents a first clock signal of the first clock signal terminal CLK1, clk2 represents a second clock signal of the second clock signal terminal CLK2, do1 represents a signal transmitted on the first gating signal line Do1, de1 represents a signal transmitted on the second gating signal line De1, do2 represents a signal transmitted on the first gating signal line Do2, de2 represents a signal transmitted on the second gating signal line De2, do3 represents a signal transmitted on the first gating signal line Do3, de3 represents a signal transmitted on the second gating signal line De3, do4 represents a signal transmitted on the first gating signal line Do4, de4 represents a signal transmitted on the second gating signal line De4, do5 represents a signal transmitted on the first gating signal line Do5, de5 represents a signal transmitted on the second gating signal line De5, do6 represents a signal transmitted on the first gating signal line Do6, de6 represents a signal transmitted on the second gating signal line De6, do7 represents a signal transmitted on the first gating signal line Do7, de7 represents a signal transmitted on the second gating signal line De7, do8 represents a signal transmitted on the first gating signal line Do8, de8 represents a signal transmitted on the second gating signal line De8, do9 represents a signal transmitted on the first gating signal line Do9, de9 represents a signal transmitted on the second gating signal line De9, do10 represents a signal transmitted on the first gating signal line Do10, de10 represents a signal transmitted on the second gating signal line De10, do11 represents a signal transmitted on the first gating signal line Do11, de11 represents a signal transmitted on the second gating signal line De11, do12 represents a signal transmitted on the first gating signal line Do12, and de12 represents a signal transmitted on the second gating signal line De12.

In addition, a blank phase H1 and a scan phase H2 in a display frame 1H are selected.

In the blank phase H1, first, the reset signal re provides a high level, the first clock signal clk1 provides a low level, the second clock signal clk2 provides a low level, the signal transmitted on the first gating signal line Do1 provides a low level, a signal transmitted on the first gating signal line Do2 provides a low level, a signal transmitted on the first gating signal line Do3 provides a low level, a signal transmitted on the first gating signal line Do4 provides a low level, a signal transmitted on the first gating signal line Do5 provides a low level, a signal transmitted on the first gating signal line Do6 provides a low level, a signal transmitted on the first gating signal line Do7 provides a low level, a signal transmitted on the first gating signal line Do8 provides a low level, a signal transmitted on the first gating signal line Do9 provides a low level, a signal transmitted on the first gating signal line Do10 provides a low level, a signal transmitted on the first gating signal line Do11 provides a low level, a signal transmitted on the first gating signal line Do12 provides a low level, a signal transmitted on the second gating signal line De1 provides a low level, a signal transmitted on the second gating signal line De2 provides a low level, a signal transmitted on the second gating signal line De3 provides a low level, a signal transmitted on the second gating signal line De4 provides a low level, a signal transmitted on the second gating signal line De5 provides a low level, a signal transmitted on the second gating signal line De6 provides a low level, a signal transmitted on the second gating signal line De7 provides a low level, a signal transmitted on the second gating signal line De8 provides a low level, a signal transmitted on the second gating signal line De9 provides a low level, a signal transmitted on the second gating signal line De10 provides a low level, a signal transmitted on the second gating signal line De11 provides a low level, and a signal transmitted on the second gating signal line De12 provides a low level. The gating control transistors M0_1 to M0_12 are all turned off under the control of the low level of signals. The first transistor M1 is turned on under the control of the high level of the reset signal, and provides the first clock signal to the first node N1. Since the first clock signal is at the low level, the signal on the first node N1 is at the low level. The second transistor M2 is turned off under the control of the low level of the signal transmitted on the first node N1. The third transistor M3 is turned off under the control of the low level of the first clock signal. The fourth transistor M4 is turned on under the control of the high level of the reset signal, and provides the reset signal to the third node N3. The fifth transistor M5 is turned off under the control of the low level transmitted on the first node N1. The seventh transistor M7 is turned on under the control of the high level of the reset signal, and provides the signal on the first reference signal terminal VREF1 to the second node N2. The sixth transistor M6 is turned off under the control of the low level of the signal on the second node N2. The first conduction transistor Mt1 is turned off under the control of the low level of the signal on the second node N2. The second conduction transistor Mt2 is turned on under the control of the high level of the signal on the third node N3. The signal at the first reference signal terminal VREF1 is provided to the driving output terminal OT, and the signal output from the driving output terminal OT is at a low level.

Then, the reset signal re provides a low level, the first clock signal clk1 provides a high level, the second clock signal clk2 provides a low level, a signal transmitted on the first gating signal line Do1 provides a high level, a signal transmitted on the first gating signal line Do2 provides a high level, a signal transmitted on the first gating signal line Do3 provides a high level, a signal transmitted on the first gating signal line Do4 provides a high level, a signal transmitted on the first gating signal line Do5 provides a high level, a signal transmitted on the first gating signal line Do6 provides a high level, a signal transmitted on the first gating signal line Do7 provides a high level, a signal transmitted on the first gating signal line Do8 provides a high level, a signal transmitted on the first gating signal line Do9 provides a high level, a signal transmitted on the first gating signal line Do10 provides a high level, a signal transmitted on the first gating signal line Do11 provides a high level, a signal transmitted on the first gating signal line Do12 provides a high level, a signal transmitted on the second gating signal line De1 provides a high level, a signal transmitted on the second gating signal line De2 provides a high level, a signal transmitted on the second gating signal line De3 provides a high level, a signal transmitted on the second gating signal line De4 provides a high level, a signal transmitted on the second gating signal line De5 provides a high level, a signal transmitted on the second gating signal line De6 provides a high level, a signal transmitted on the second gating signal line De7 provides a high level, a signal transmitted on the second gating signal line De8 provides a high level, a signal transmitted on the second gating signal line De9 provides a high level, a signal transmitted on the second gating signal line De10 provides a high level, a signal transmitted on the second gating signal line De11 provides a high level, and a signal transmitted on the second gating signal line De12 provides a high level. The gating control transistors M 0_1 to M0_12 are all turned on under the control of the high level of signals, the high level of the first clock signal is provided to the first node N1, and the signal on the first node N1 is at a high level. The first transistor M1 is turned off under the control of the low level of the reset signal. The second transistor M2 is turned on under the control of the high level of the signal transmitted on the first node N1, and provides the first clock signal to the first electrode of the third transistor M3. The third transistor M3 is turned on under the control of the high level of the first clock signal. The first clock signal on the first electrode of the third transistor M3 is provided to the second node N2, and the signal on the second node N2 is a high level. The fourth transistor M4 is turned off under the control of the low level of the reset signal. The fifth transistor M5 is turned on under the control of the high level transmitted on the first node N1. The low level of the reset signal is provided to the third node N3, and the signal on the third node N3 is at a low level. The seventh transistor M7 is turned off under the control of the low level of the signal on the third node N3. The sixth transistor M6 is turned on under the control of the high level of the signal on the second node N2, and provides the reset signal to the third node N3. The second conduction transistor Mt2 is turned off under the control of the low level of the signal on the third node N3. The first conduction transistor Mt1 is turned on under the control of the high level of the signal on the second node N2. The second clock signal is provided to the driving output terminal OT, and the signal output by the driving output terminal OT is at a low level.

In the scan phase H2, the reset signal re provides a low level, the first clock signal clk1 provides a low level, the second clock signal clk2 provides a high level, the signal transmitted on the first gating signal line Do1 provides a high level, a signal transmitted on the first gating signal line Do2 provides a high level, a signal transmitted on the first gating signal line Do3 provides a high level, a signal transmitted on the first gating signal line Do4 provides a high level, a signal transmitted on the first gating signal line Do5 provides a high level, a signal transmitted on the first gating signal line Do6 provides a high level, a signal transmitted on the first gating signal line Do7 provides a high level, a signal transmitted on the first gating signal line Do8 provides a high level, a signal transmitted on the first gating signal line Do9 provides a high level, a signal transmitted on the first gating signal line Do10 provides a high level, a signal transmitted on the first gating signal line Do11 provides a high level, a signal transmitted on the first gating signal line Do12 provides a high level, a signal transmitted on the second gating signal line De1 provides a high level, a signal transmitted on the second gating signal line De2 provides a high level, a signal transmitted on the second gating signal line De3 provides a high level, a signal transmitted on the second gating signal line De4 provides a high level, a signal transmitted on the second gating signal line De5 provides a high level, a signal transmitted on the second gating signal line De6 provides a high level, a signal transmitted on the second gating signal line De7 provides a high level, a signal transmitted on the second gating signal line De8 provides a high level, a signal transmitted on the second gating signal line De9 provides a high level, a signal transmitted on the second gating signal line De10 provides a high level, a signal transmitted on the second gating signal line De11 provides a high level, and a signal transmitted on the second gating signal line De12 provides a high level. The gating control transistors M0_1 to M0_12 are all turned on under the control of the high level of signals, the low level of the first clock signal is provided to the first node N1, and the signal on the first node N1 is at a low level. The first transistor M1 is turned off under the control of the low level of the reset signal. The second transistor M2 is turned off under the control of the low level of the signal transmitted on the first node N1. The third transistor M3 is turned off under the control of the low level of the first clock signal, and the second node N2 maintains the high level of the previous stage. The fourth transistor M4 is turned off under the control of the low level of the reset signal. The fifth transistor M5 is turned off under the control of the low level transmitted on the first node N1. The seventh transistor M7 is turned off under the control of the low level of the reset signal. The sixth transistor M6 is turned on under the control of the high level of the signal on the second node N2, and provides the reset signal to the third node N3. The second conduction transistor Mt2 is turned off under the control of the low level of the signal on the third node N3. The first conduction transistor Mt1 is turned on under the control of the high level of the signal on the second node N2. The second clock signal is provided to the driving output terminal OT, and the signal output by the driving output terminal OT is at a high level.

Illustratively, since the gating control transistors M0_1 to M0_12 are in series, whenever one of the gating control transistors is turned off, the gating control circuit cannot operate normally, i.e., cannot provide the first clock signal to the first node N1, that is, the conduction control circuit does not operate properly. The gating control circuit can be controlled by controlling a signal on the first gating signal line or the second gating signal line, to control the conduction control circuit and further conduct the column of sub-pixels corresponding to the control circuit, realizing the function of adjusting partitions intelligently.

Figure 8:
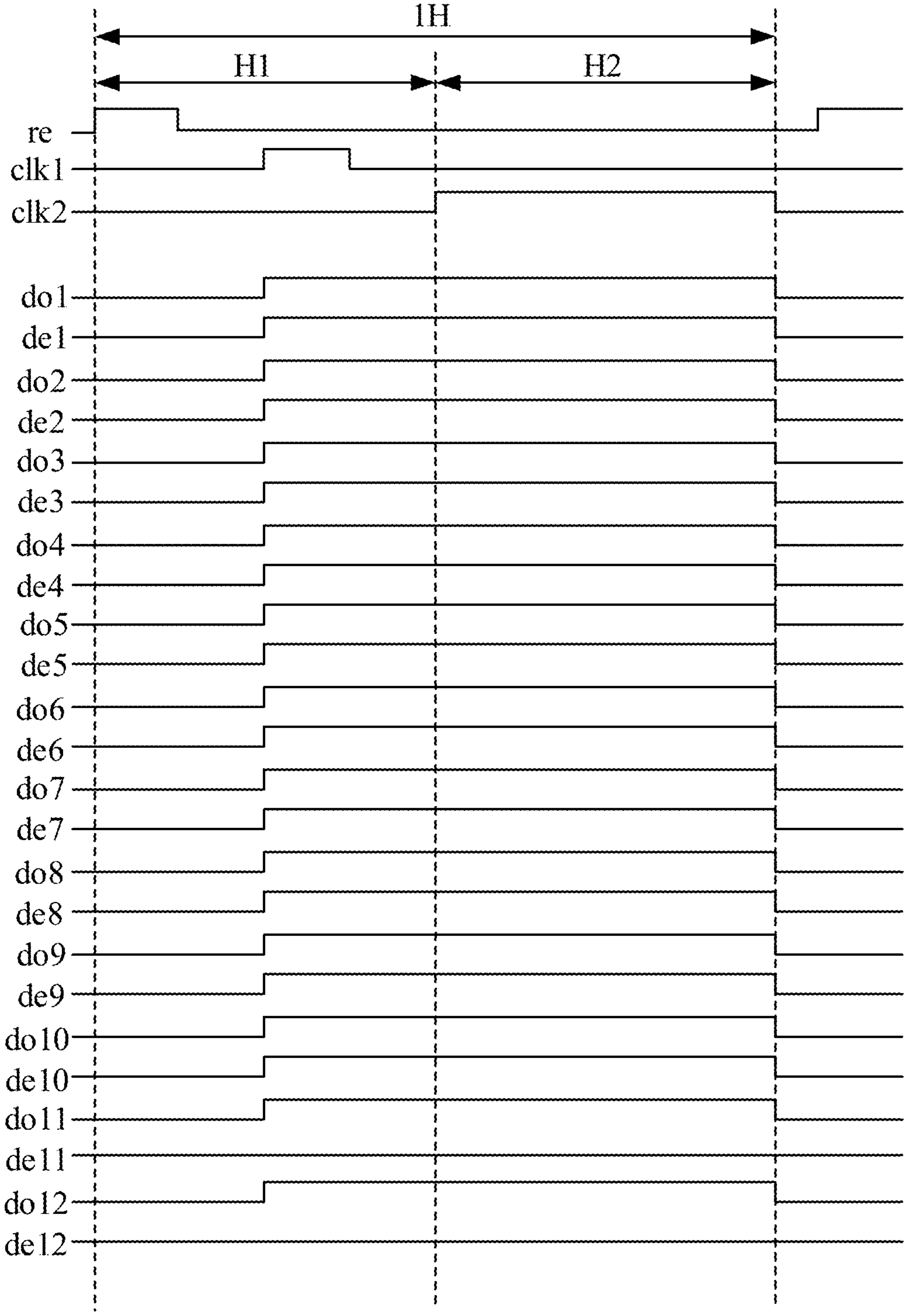
FIG. 8 is another timing diagram of signals according to an embodiment of the present disclosure.

Illustratively, in a case that the conduction control circuit includes 12 gating control transistors, sub-pixels of the display panel may be partitioned into 4096 columns. As shown in FIG. 8, since the signal transmitted on the second gating signal line De11 is at a low level, and the signal transmitted on the second gating signal line De12 is at a low level, conduction control circuits with gating control signal terminals connected to the second gating signal line De11 and/or the second gating signal line De12 do not work properly (for example, the conduction control circuit coupled to the second gating signal line De11 corresponds to the $1025^{th}$ column of sub-pixels to the $2048^{th}$ column of sub-pixels, and the conduction control circuit coupled to the second gating signal line De12 corresponds to the $2049^{th}$ column of sub-pixels to the $4096^{th}$ column of sub-pixels). Then columns of sub-pixels corresponding to the conduction control circuits (for example, the $1025^{th}$ column of sub-pixels to the $4096^{th}$ column of sub-pixels) cannot be displayed normally, that is, the display panel is adjusted and controlled for different partitions, so that the display panel works for different partitions.

Figure 9:
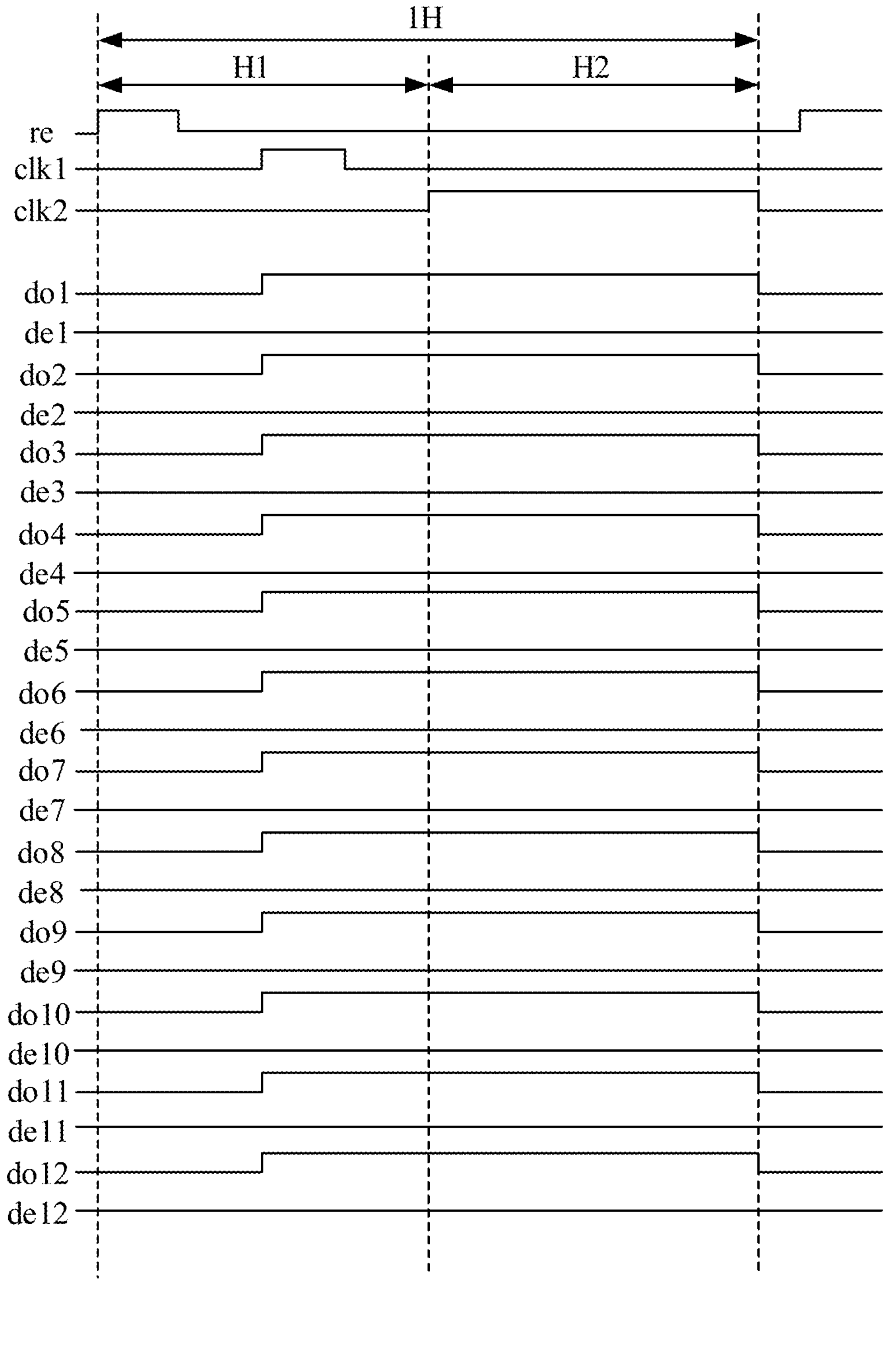
FIG. 9 is another timing diagram of signals according to an embodiment of the present disclosure.

Illustratively, as shown in FIG. 9, since the signals transmitted on the second gating signal lines De1 to De12 are at a low level, only the conduction control circuit with gating control signal terminals coupled to the first gating signal line D01 to D012 can operate normally, i.e. only one conduction control circuit (e.g., the conduction control circuit coupled to the first column of sub-pixels) can operate normally, the other conduction control circuits cannot operate normally, then only one column of sub-pixels (e.g., the first column of sub-pixels) can perform normal display, and the other columns of sub-pixels cannot perform normal display.

Figure 10:
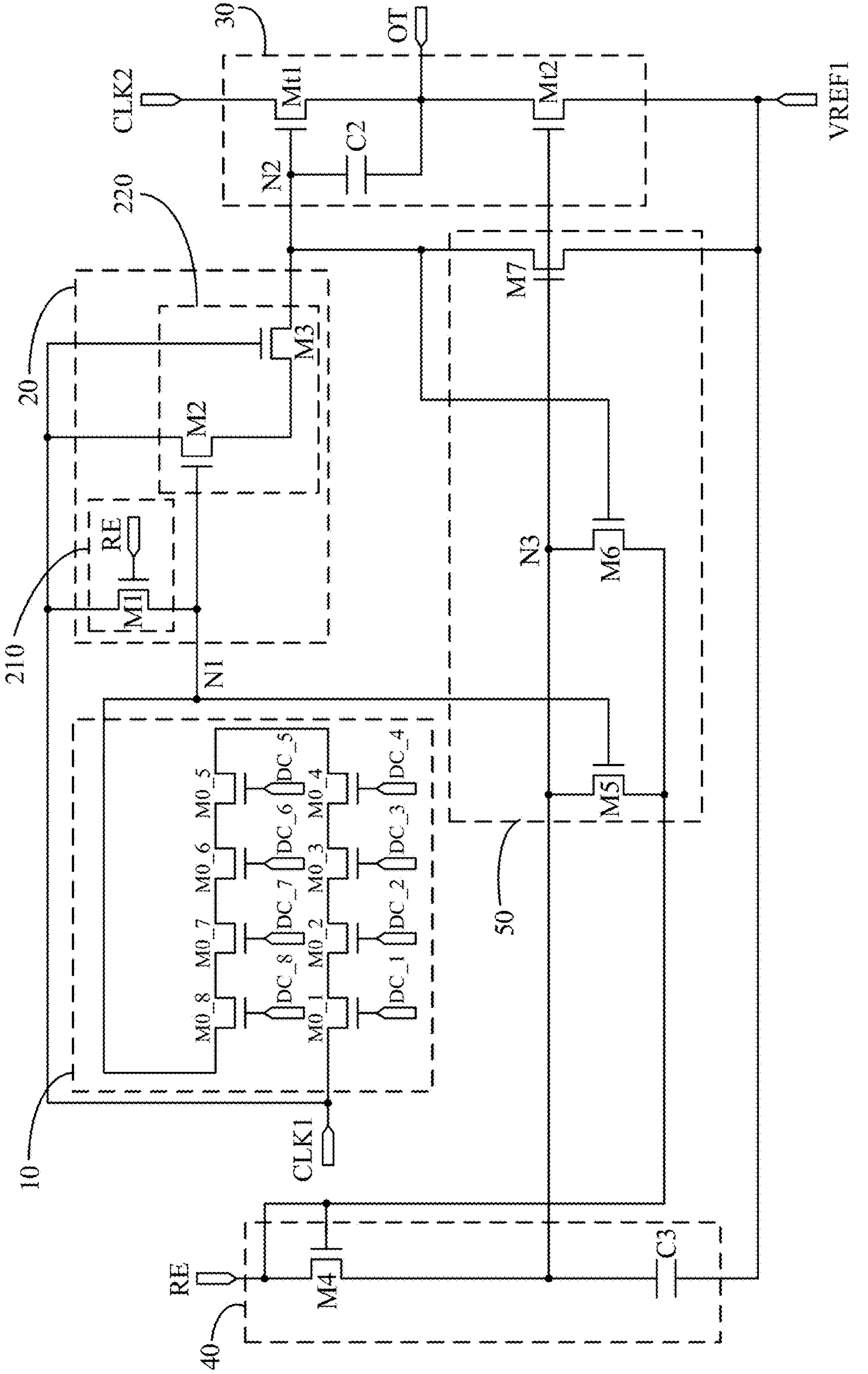
FIG. 10 is another structural schematic diagram of a conduction control circuit according to an embodiment of the present disclosure.

Embodiments of the present disclosure provide some other structural schematic diagrams of the conduction control circuit. As shown in FIG. 10, FIG. 10 is a variation of embodiments described above. Only differences between this embodiment and the above embodiments will be described below, and similarities will not be repeated here.

In some embodiments of the present disclosure, as shown in FIG. 10, the gating control circuit 10 includes eight gating control transistors. A gate of the first gating control transistor M0_1 is coupled to a corresponding gating control signal terminal DC_1, a first electrode of the first gating control transistor M0_1 is coupled to a first clock signal terminal CLK1, and a second electrode of the first gating control transistor M0_1 is coupled to a first electrode of a second gating control transistor M0_2. A gate of the second gating control transistor M0_2 is coupled to a corresponding gating control signal terminal DC_2, and a second electrode of the second gating control transistor M0_2 is coupled to a first electrode of a third gating control transistor M0_3. A gate of the third gating control transistor M0_3 is coupled to a corresponding gating control signal terminal DC_3, and a second electrode of the third gating control transistor M0_3 is coupled to a first electrode of a fourth gating control transistor M0_4. A gate of the fourth gating control transistor M0_4 is coupled to a corresponding gating control signal terminal DC_4, and a second electrode of the fourth gating control transistor M0_4 is coupled to a first electrode of a fifth gating control transistor M0_5. A gate of the fifth gating control transistor M0_5 is coupled to a corresponding gating control signal terminal DC_5, and a second electrode of the fifth gating control transistor M0_5 is coupled to a first electrode of a sixth gating control transistor M0_6. A gate of the sixth gating control transistor M0_6 is coupled to a corresponding gating control signal terminal DC_6, and a second electrode of the sixth gating control transistor M0_6 is coupled to a first electrode of a seventh gating control transistor M0_7. A gate of the seventh gating control transistor M0_7 is coupled to a corresponding gating control signal terminal DC_7, and a second electrode of the seventh gating control transistor M0_7 is coupled to a first electrode of an eighth gating control transistor M0_8. A gate of the eighth gating control transistor M0_8 is coupled to a corresponding gating control signal terminal DC_8, and a second electrode of the eighth gating control transistor M0_8 is coupled to the first node N1.

Illustratively, the number of gating control transistors may be adjusted to adjust the number of partitions of the display panel. As shown in 10, since each gating control signal terminal in the conduction control circuit may be coupled to the first gating signal line or the second gating signal line, that is, each gating control signal terminal has two coupling modes. When there are 8 gating control signal terminals in the conduction control circuit, the conduction control circuit has $2^8$ (i.e., 256) coupling modes. Furthermore, because one conduction control circuit corresponds to one column of sub-pixels, when there are 8 gating control signal terminals in the conduction control circuit, 256 columns of sub-pixels correspond to conduction control circuits, and only 256 column partitions can be realized at most. It can be seen that the timing controller only needs to provide gating control signals for the 8 first gating signal lines and the 8 second gating signal lines, so that the light emission of each column of sub-pixels can be controlled by the conduction control circuit, that is, the number of signal lines is reduced, so that the space is saved, and the cost is further reduced. In addition, since the coupling modes of the conduction control circuits are not completely the same, the ability to adjust intelligently can be provided.

Illustratively, the conduction control circuit can be optimally adjusted according to requirements, the number of gating control transistors and corresponding gating control signal terminals in the conduction control circuit determine the number of column of partitions. If the number of the gating control transistors is N, the number of column of partitions is 2 N. If single-point driving of the sub-pixel is to be realized, it is necessary to ensure that $2^N$ is not less than V (V is the maximum number of columns corresponding to the sub-pixels of the display panel).

Figure 11:
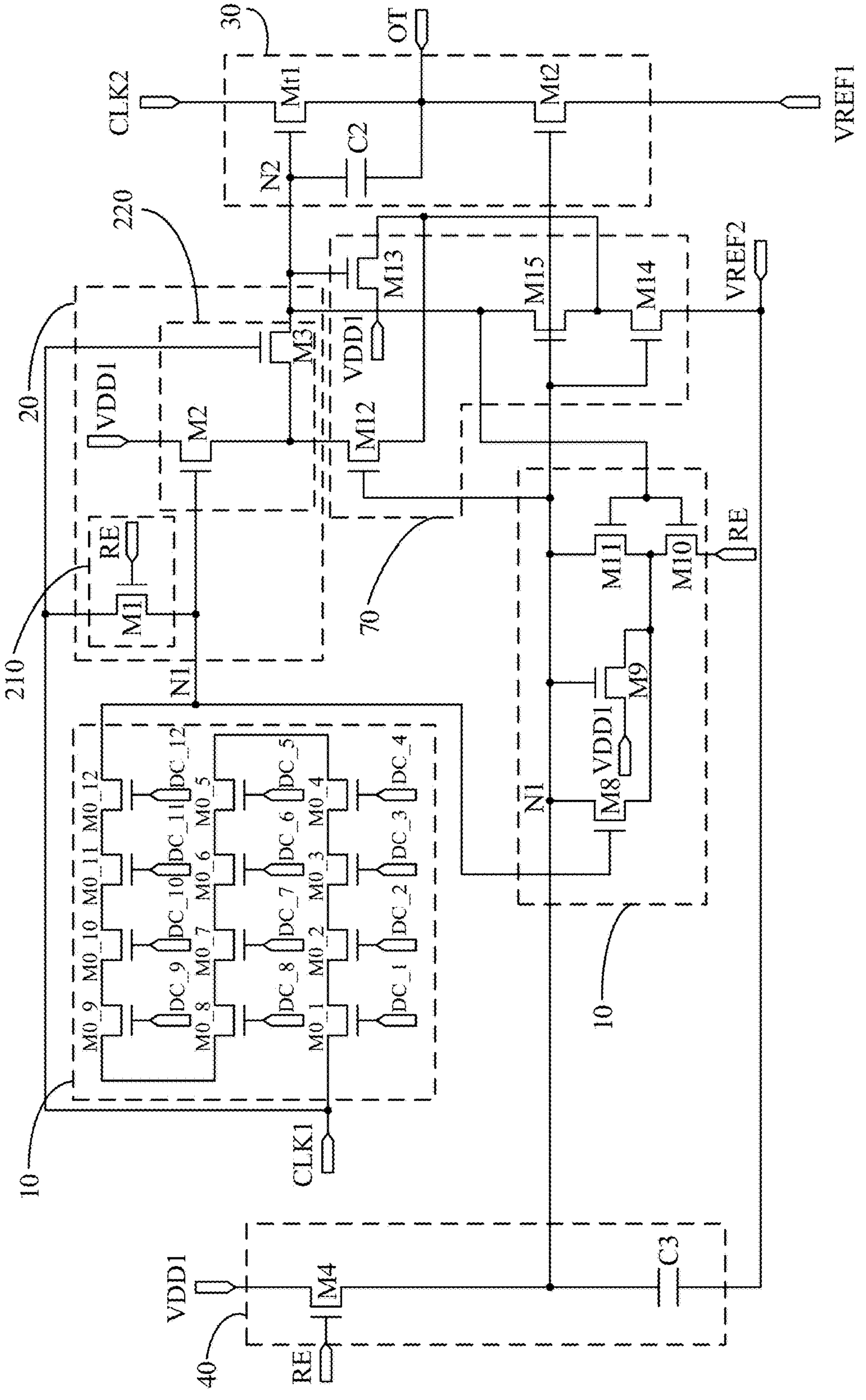
FIG. 11 is another structural schematic diagram of a conduction control circuit according to an embodiment of the present disclosure.

Embodiments of the present disclosure provide further structural schematic diagrams of the conduction control circuit. As shown in FIG. 11, FIG. 11 is a variation of embodiments described above. Only differences between this embodiment and the above embodiments will be described below, and similarities will not be repeated here.

In some other embodiments of the present disclosure, as shown in FIG. 11, a second control circuit 220 is configured to provide the signal of the first power supply terminal VDD1 to the second node N2 in response to the signal of the first clock signal terminal CLK1 and the signal of the first node N1.

In some embodiments of the present disclosure, as shown in FIG. 11, a gate of the second transistor M2 is coupled to the first node N1, a first electrode of the second transistor M2 is coupled to the first power supply terminal VDD1, and a second electrode of the second transistor M2 is coupled to a first electrode of the third transistor M3.

In some embodiments of the present disclosure, as shown in FIG. 11, the conduction control circuit further includes a reset circuit 40 configured to provide a signal of the first power supply terminal VDD1 to the third node N3 in response to the signal of the reset signal terminal RE.

In some embodiments of the present disclosure, as shown in FIG. 11, a gate of the fourth transistor M4 is coupled to the reset signal terminal RE, a first electrode of the fourth transistor M4 is coupled to the first power supply terminal VDD1, and a second electrode of the fourth transistor M4 is coupled to the third node N3. A first electrode of the third capacitor C3 is coupled to the second electrode of the fourth transistor M4, and a second electrode of the third capacitor C3 is coupled to the second reference signal terminal VREF2.

In some embodiments of the present disclosure, as shown in FIG. 11, the conduction control circuit further includes a fourth control circuit 60 configured to control the signal of the third node N3 in response to the signal of the first node N1, the signal of the second node N2, and the signal of the third node N3.

As shown in FIG. 11, in some embodiment of the present disclosure, the fourth control circuit 60 includes an eighth transistor M8, a ninth transistor M9, a tenth transistor M10, and an eleventh transistor M11. A gate of the eighth transistor M8 is coupled to the first node N1, a first electrode of the eighth transistor M8 is coupled to the third node N3, and a second electrode of the eighth transistor M8 is coupled to a second electrode of the ninth transistor M9. A gate of the ninth transistor M9 is coupled to the third node N3, and a first electrode of the ninth transistor M9 is coupled to the first power supply terminal VDD1. A gate of the tenth transistor M10 is coupled to the second node N2, a first electrode of the tenth transistor M10 is coupled to the reset signal terminal RE, and a second electrode of the tenth transistor M10 is coupled to a second electrode of the ninth transistor M9. A gate of the eleventh transistor M11 is coupled to the second node N2, a first electrode of the eleventh transistor M11 is coupled to the second electrode of the tenth transistor M10, and a second electrode of the eleventh transistor M11 is coupled to the third node N3.

Illustratively, the eighth transistor may be turned on under control of the active level of the signal transmitted on the first node, and may be turned off under control of the inactive level of the signal transmitted on the first node. For example, if the eighth transistor is a P-type transistor, then the active level of the signal transmitted on the first node is a low level, and the inactive level of the signal transmitted on the first node is a high level. Alternatively, if the eighth transistor is an N-type transistor, then the active level of the signal transmitted on the first node is a high level, and the inactive level of the signal transmitted on the first node is a low level.

Illustratively, the ninth transistor may be turned on under control of the active level of the signal transmitted on the third node, and may be turned off under control of the inactive level of the signal transmitted on the third node. For example, if the ninth transistor is a P-type transistor, then the active level of the signal transmitted on the third node is a low level, and the inactive level of the signal transmitted on the third node is a high level. Alternatively, if the ninth transistor is an N-type transistor, then the active level of the signal transmitted on the third node is a high level, and the inactive level of the signal transmitted on the third node is a low level.

Illustratively, the tenth transistor and the eleventh transistor may be turned on under control of the active level of the signal transmitted on the second node, and may be turned off under control of the inactive level of the signal transmitted on the second node. For example, if the tenth transistor and the eleventh transistor are P-type transistors, then the active level of the signal transmitted on the second node is a low level, and the inactive level of the signal transmitted on the second node is a high level. Alternatively, if the tenth transistor and the eleventh transistor are N-type transistors, then the active level of the signal transmitted on the second node is a high level, and the inactive level of the signal transmitted on the second node is a low level.

In some embodiments of the present disclosure, as shown in FIG. 11, the conduction control circuit further includes a fifth control circuit 70 configured to control the signal of the second node N2 in response to the signal of the third node N3.

As shown in FIG. 11, in some embodiment of the present disclosure, the fifth control circuit 70 includes a twelfth transistor M12, a thirteenth transistor M13, a fourteenth transistor M14, and a fifteenth transistor M15. A gate of the twelfth transistor M12 is coupled to the third node N3, a first electrode of the twelfth transistor M12 is coupled to a first electrode of the third transistor M3, and a second electrode of the twelfth transistor M12 is coupled to a second electrode of the thirteenth transistor M13. A gate of the thirteenth transistor M13 is coupled to the second node N2, and a first electrode of the thirteenth transistor M13 is coupled to the first power supply terminal VDD1. A gate of the fourteenth transistor M14 is coupled to the third node N3, a first electrode of the fourteenth transistor M14 is coupled to a second reference signal terminal VREF2, and a second electrode of the fourteenth transistor M14 is coupled to the second electrode of the thirteenth transistor M13. A gate of the fifteenth transistor M15 is coupled to the third node N3, a first electrode of the fifteenth transistor M15 is coupled to the second electrode of the fourteenth transistor m14, and a second electrode of the fifteenth transistor M15 is coupled to the second node N2.

Illustratively, the twelfth transistor, the fourteenth transistor, and the fifteenth transistor may be turned on under control the active level of the signal transmitted on the third node, and may be turned off under control of the inactive level of the signal transmitted on the third node. For example, if the twelfth transistor, the thirteenth transistor, the fourteenth transistor, and the fifteenth transistor are P-type transistors, then the active level of the signal transmitted on the third node is a low level, and the inactive level of the signal transmitted on the third node is a high level. Alternatively, if the twelfth transistor, the thirteenth transistor, the fourteenth transistor, and the fifteenth transistor are N-type transistors, then the active level of the signal transmitted on the third node is a high level, and the inactive level of the signal transmitted on the third node is a low level.

Illustratively, the thirteenth transistor may be turned on under control of the active level of the signal transmitted on the second node, and may be turned off under control of the inactive level of the signal transmitted on the second node. For example, if the thirteenth transistor is a P-type transistor, then the active level of the signal transmitted on the second node is a low level, and the inactive level of the signal transmitted on the second node is a high level. Alternatively, if the thirteenth transistor is an N-type transistor, then the active level of the signal transmitted on the second node is a high level, and the inactive level of the signal transmitted on the second node is a low level.

Illustratively, the first electrode of the above transistor may be a source, and the second electrode may be a drain. Alternatively, the first electrode is a drain and the second electrode is a source, which is not limited herein.

Illustratively, the circuit structure shown in FIG. 11 is applicable to an oxide backplane with a negative initial threshold voltage, which is not limited herein.

Figure 12:
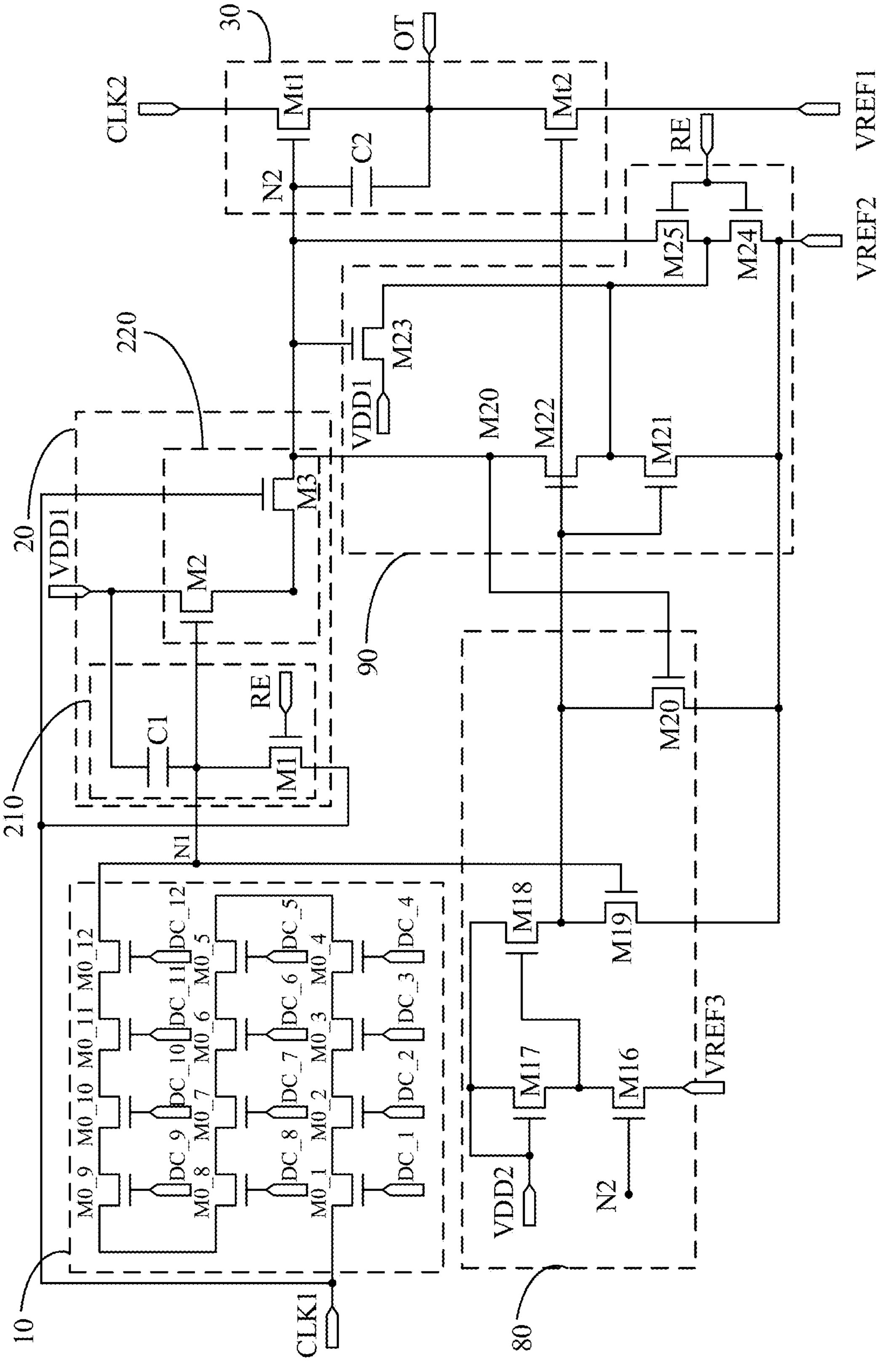
FIG. 12 is another structural schematic diagram of a conduction control circuit according to an embodiment of the present disclosure.

Embodiments of the present disclosure provide another structural schematic diagram of a conduction control circuit. As shown in FIG. 12, FIG. 12 is a variation of embodiments described above. Only differences between this embodiment and the above embodiments will be described below, and similarities will not be repeated here.

In some embodiments of the present disclosure, as shown in FIG. 12, the first control circuit 210 further includes a first capacitor C1. A first electrode of the first capacitor C1 is coupled to the first power supply terminal VDD1, and a second electrode of the first capacitor C1 is coupled to the first node N1.

In some embodiments of the present disclosure, as shown in FIG. 12, the conduction control circuit further includes a sixth control circuit 80 configured to control the signal of the third node in response to the signal of the first node, the signal of the third node, and a signal of a second power supply terminal.

As shown in FIG. 12, in some embodiment of the present disclosure, the sixth control circuit 80 includes a sixteenth transistor M16, a seventeenth transistor M17, an eighteenth transistor M18, and a nineteenth transistor M19. A gate of the sixteenth transistor M16 is coupled to the second node N2, a first electrode of the sixteenth transistor M16 is coupled to a third reference signal terminal VREF3, and a second electrode of the sixteenth transistor M16 is coupled to a first electrode of the seventeenth transistor M17. A gate of the seventeenth transistor M17 is coupled to the second power supply terminal VDD2, and a second electrode of the seventeenth transistor M17 is coupled to the second power supply terminal VDD2. A gate of the eighteenth transistor M18 is coupled to the first electrode of the seventeenth transistor M17, a first electrode of the eighteenth transistor M18 is coupled to the third node N3, and a second electrode of the eighteenth transistor M18 is coupled to the second power supply terminal VDD2. A gate of the nineteenth transistor M19 is coupled to the first node N1, a first electrode of the nineteenth transistor M19 is coupled to the first electrode of the eighteenth transistor M18, and a second electrode of the nineteenth transistor M19 is coupled to the second reference signal terminal VREF2. A gate of the twentieth transistor M20 is coupled to the second node N2, a first electrode of the twentieth transistor M20 is coupled to the third node N3, and a second electrode of the twentieth transistor M20 is coupled to the second reference signal terminal VREF2.

Illustratively, the sixteenth transistor may be turned on under control of the active level of the signal transmitted on the second node, and may be turned off under control of the inactive level of the signal transmitted on the second node. For example, if the sixteenth transistor is a P-type transistor, then the active level of the signal transmitted on the second node is a low level, and the inactive level of the signal transmitted on the second node is a high level. Alternatively, if the sixteenth transistor is an N-type transistor, then the active level of the signal transmitted on the second node is a high level, and the inactive level of the signal transmitted on the second node is a low level.

Illustratively, the seventeenth transistor may be turned on under control of the active level of the signal at the second power supply terminal, and may be turned off under control of the inactive level of the signal at the second power supply terminal. For example, if the seventeenth transistor is a P-type transistor, then the active level of the signal at the second power supply terminal is a low level, and the inactive level of the signal of the second power supply terminal is a high level. Alternatively, if the seventeenth transistor is an N-type transistor, then the active level of the signal at the second power end is a high level, and the inactive level of the signal at the second power supply terminal is a low level.

Illustratively, the eighteenth transistor may be turned on under control of the active level of the signal at the first electrode of the seventeenth transistor, and may be turned off under control of the inactive level of the signal of the first electrode of the seventeenth transistor. Illustratively, the eighteenth transistor is a P-type transistor, then the active level of the signal of the first electrode of the seventeenth transistor is low, and the inactive level of the signal of the first electrode of the seventeenth transistor is a high level. Alternatively, if the eighteenth transistor is an N-type transistor, then the active level of the signal of the first electrode of the seventeenth transistor is a high level, and the inactive level of the signal of the first electrode of the seventeenth transistor is a low level.

Illustratively, the nineteenth transistor may be turned on under control of the active level of the signal transmitted on the first node, and may be turned off under control of the inactive level of the signal transmitted on the first node. For example, if the nineteenth transistor is a P-type transistor, then the active level of the signal transmitted on the first node is a low level, and the inactive level of the signal transmitted on the first node is a high level. Alternatively, if the nineteenth transistor is an N-type transistor, then the active level of the signal transmitted on the first node is a high level, and the inactive level of the signal transmitted on the first node is a low level.

Illustratively, the twentieth transistor may be turned on under control of the active level of the signal transmitted on the second node, and may be turned off under control of the inactive level of the signal transmitted on the second node. For example, if the twentieth transistor is a P-type transistor, then the active level of the signal transmitted on the second node is a low level, and the inactive level of the signal transmitted on the second node is a high level. Alternatively, if the twentieth transistor is an N-type transistor, then the active level of the signal transmitted on the second node is a high level, and the inactive level of the signal transmitted on the second node is a low level. In some embodiments of the present disclosure, as shown in FIG. 12, the conduction control circuit further includes a seventh control circuit 90 configured to control the signal of the second node N2 in response to the signal of the second node N2, the signal of the third node N3, and the reset signal terminal RE.

As shown in FIG. 12, in some embodiment of the present disclosure, the seventh control circuit 90 includes a twenty-first transistor M21, a twenty-second transistor M22, a twenty-third transistor M23, a twenty-fourth transistor M24 and a twenty-fifth transistor M25. A gate of the twenty-first transistor M21 is coupled to the third node N3, a first electrode of the twenty-first transistor M21 is coupled to the second reference signal terminal VREF2, and a second electrode of the twenty-first transistor M21 is coupled to a first electrode of the twenty-second transistor M22. A gate of the twenty-second transistor M22 is coupled to the third node N3, and a second electrode of the twenty-second transistor M22 is coupled to the second node N2. A gate of the twenty-third transistor M23 is coupled to the second node N2, a first electrode of the twenty-third transistor M23 is coupled to the first power supply terminal VDD1, and a second electrode of the twenty-third transistor M23 is coupled to a first electrode of the twenty-second transistor M22. A gate of the twenty-fourth transistor M24 is coupled to a reset signal terminal RE, a first electrode of the twenty-fourth transistor M24 is coupled to the second reference signal terminal VREF2, and a second electrode of the twenty-fourth transistor M24 is coupled to the first electrode of the twenty-second transistor M22.

A gate of the twenty-fifth transistor M25 is coupled to the reset signal terminal RE, a first electrode of the twenty-fifth transistor M25 is coupled to the second electrode of the twenty-fourth transistor m24, and a second electrode of the twenty-fifth transistor M25 is coupled to the second node N2.

Illustratively, the twenty-first transistor and the twenty-second transistor may be turned on under control of the active level of the signal transmitted on the third node, and may be turned off under control of the inactive level of the signal transmitted on the third node. For example, if the twenty-first transistor and the twenty-second transistor are P-type transistors, then the active level of the signal transmitted on the third node is a low level and the inactive level of the signal transmitted on the third node is a high level. Alternatively, if the twenty-first transistor and the twenty-second transistor are N-type transistors, then the active level of the signal transmitted on the third node is a high level, and the inactive level of the signal transmitted on the third node is a low level.

Illustratively, the twenty-third transistor may be turned on under control of the active level of the signal transmitted on the second node, and may be turned off under control of the inactive level of the signal transmitted on the second node. For example, if the twenty-third transistor is a P-type transistor, then the active level of the signal transmitted on the second node is a low level, and the inactive level of the signal transmitted on the second node is a high level. Alternatively, if the twenty-third transistor is an N-type transistor, then the active level of the signal transmitted on the second node is a high level, and the inactive level of the signal transmitted on the second node is a low level.

Illustratively, the twenty-fourth transistor and the twenty-fifth transistor may be turned on under the control of the active level of the reset signal transmitted by the reset signal terminal, and may be turned off under control of the inactive level of the reset signal. For example, if the twenty-fourth transistor and the twenty-fifth transistor are P-type transistors, then the active level of the reset signal is a low level, and the inactive level of the reset signal is a high level. Alternatively, if the twenty-fourth transistor and the twenty-fifth transistor are N-type transistors, then the active level of the reset signal is a high level, and the inactive level of the reset signal is a low level.

Illustratively, the first electrode of the above transistor may be a source, and the second electrode may be a drain. Alternatively, the first electrode is a drain and the second electrode is a source, which is not limited herein.

Illustratively, the circuit structure shown in FIG. 12 is suitable for low power consumption display and the like, and is not limited thereto.

Base on the same concept, embodiments of the present disclosure further provide a display device. The principle of including the display device to solve the problem is similar to that of the aforementioned display panel. Therefore, implementations of the display device can be referred to implementations of the display panel, and the repetition is not repeated here.

In practice, in embodiments of the present disclosure, the display device can be any product or component that has a display function, for example, a mobile phone, a tablet computer, a television, a display, a notebook computer, a digital photo frame, a navigator or the like. Other essential components of the display device are as will be understood by those skilled in the art, which are not described in detail herein, and should not be taken as a limitation on the present disclosure.

The above is only an example to illustrate the specific structure of each module in the pixel circuit according to embodiments of the present disclosure. The above specific structure is not limited to the above structure according to embodiments of the present disclosure, and can also be other structures known by those skilled in the art, which is not limited here.

Although embodiments of the present disclosure have been described, those of skill in the art may otherwise make various modifications and variations to these embodiments once they are aware of the basic inventive concept. Therefore, the claims intend to include embodiments as well as all these modifications and variations falling within the scope of the present disclosure.

Apparently, those skilled in the art can make various modifications and variations to embodiments of the present disclosure without departing from the spirit and scope of embodiments of the present disclosure. In this way, if the modifications and variations of embodiments of the present disclosure fall within the scope of the claims of the present disclosure and their equivalent technologies, the present disclosure is also intended to include these modifications and variations.

What is claimed is:

1. A conduction control circuit, comprising: a gating control circuit, coupled to a first node, and configured to provide a signal of a first clock signal terminal to the first node in response to signals of a plurality of different gating control signal terminals; a control circuit, coupled to the first node and a second node, and configured to provide the signal of the first clock signal terminal or a signal of a first power supply terminal to the second node in response to a signal of the first node; and a conduction signal output circuit, coupled to the second node and a third node, and configured to provide a signal of a second clock signal terminal to a driving output terminal in response to a signal of the second node, and provide a signal of a first reference signal terminal to the driving output terminal in response to a signal of the third node.

2. The conduction control circuit according to claim 1, wherein the gating control circuit comprises: N gating control transistors; the N gating control transistors are in one-to-one correspondence with the plurality of different gating control signal terminals; a gate of an nth gating control transistor of the N gating control transistors is coupled to a gating control signal terminal corresponding to the nth gating control transistor; a first electrode of a 1st gating control transistor of the N gating control transistors is coupled to the first clock signal terminal; a second electrode of the Nth gating control transistor of the N gating control transistors is coupled to the first node; and the second electrode of the nth gating control transistor of the N gating control transistors is coupled to a first electrode of an (n+1)th gating control transistor of the N gating control transistors.

3. The conduction control circuit according to claim 2, wherein the control circuit comprises: a first control circuit, configured to provide the signal of the first clock signal terminal to the first node in response to a signal of a reset signal terminal; and a second control circuit, configured to provide the signal of the first clock signal terminal or the signal of the first power supply terminal to the second node in response to the signal of the first clock signal terminal and the signal of the first node.

4. The conduction control circuit according to claim 3, wherein the first control circuit comprises: a first transistor; wherein a gate of the first transistor is coupled to the reset signal terminal, a first electrode of the first transistor is coupled to the first node, and a second electrode of the first transistor is coupled to the first clock signal terminal.

5. The conduction control circuit according to claim 3, wherein the second control circuit comprises: a second transistor and a third transistor; wherein a gate of the second transistor is coupled to the first node, a first electrode of the second transistor is coupled to the first clock signal terminal or the first power supply terminal, and a second electrode of the second transistor is coupled to a first electrode of the third transistor; and a gate of the third transistor is coupled to the first clock signal terminal, and a second electrode of the third transistor is coupled to the second node; wherein the second control circuit further comprises: a first capacitor; wherein a first electrode of the first capacitor is coupled to the first power supply terminal, and a second electrode of the first capacitor is coupled to the first node.

6. The conduction control circuit according to claim 1, wherein the conduction signal output circuit comprises: a first conduction transistor, a second conduction transistor and a second capacitor; wherein a gate of the first conduction transistor is coupled to the second node, a first electrode of the first conduction transistor is coupled to the second clock signal terminal, and a second electrode of the first conduction transistor is coupled to the driving output terminal; a gate of the second conduction transistor is coupled to the third node, a first electrode of the second conduction transistor is coupled to the driving output terminal, and a second electrode of the second conduction transistor is coupled to the first reference signal terminal; and a first electrode of the second capacitor is coupled to the second node, and a second electrode of the second capacitor is coupled to the driving output terminal.

7. The conduction control circuit according to claim 6, further comprising: a reset circuit, configured to provide a signal of a reset signal terminal or the signal of the first power supply terminal to the third node in response to the signal of the reset signal terminal; wherein the reset circuit comprises: a fourth transistor and a third capacitor; wherein a gate of the fourth transistor is coupled to the reset signal terminal, a first electrode of the fourth transistor is coupled to the reset signal terminal or the first power supply terminal, and a second electrode of the fourth transistor is coupled to the third node; and a first electrode of the third capacitor is coupled to the second electrode of the fourth transistor, and a second electrode of the third capacitor is coupled to the first reference signal terminal or a second reference signal terminal.

8. The conduction control circuit according to claim 7, further comprising: a third control circuit, configured to control the signal of the third node in response to the signal of the first node and the signal of the third node; wherein the third control circuit comprises: a fifth transistor, a sixth transistor, and a seventh transistor; wherein a gate of the fifth transistor is coupled to the first node, a first electrode of the fifth transistor is coupled to the third node, and a second electrode of the fifth transistor is coupled to a reset signal terminal; a gate of the sixth transistor is coupled to the second node, a first electrode of the sixth transistor is coupled to the third node, and a second electrode of the sixth transistor is coupled to the reset signal terminal; and a gate of the seventh transistor is coupled to the third node, a first electrode of the seventh transistor is coupled to the second node, and a second electrode of the seventh transistor is coupled to the first reference signal terminal.

9. The conduction control circuit according to claim 8, further comprising: a fourth control circuit, configured to control the signal of the third node in response to the signal of the first node, the signal of the second node, and the signal of the third node.

10. The conduction control circuit according to claim 9, wherein the fourth control circuit comprises: an eighth transistor, a ninth transistor, a tenth transistor, and an eleventh transistor; wherein a gate of the eighth transistor is coupled to the first node, a first electrode of the eighth transistor is coupled to the third node, and a second electrode of the eighth transistor is coupled to a second electrode of the ninth transistor; a gate of the ninth transistor is coupled to the third node, and a first electrode of the ninth transistor is coupled to the first power supply terminal; a gate of the tenth transistor is coupled to the second node, a first electrode of the tenth transistor is coupled to a reset signal terminal, and a second electrode of the tenth transistor is coupled to the second electrode of the ninth transistor; and gate of the eleventh transistor is coupled to the second node, a first electrode of the eleventh transistor is coupled to the second electrode of the tenth transistor, and a second electrode of the eleventh transistor is coupled to the third node.

11. The conduction control circuit according to claim 10, further comprising: a fifth control circuit, configured to control the signal of the second node in response to the signal of the third node.

12. The conduction control circuit according to claim 11, wherein the fifth control circuit comprises: a twelfth transistor, a thirteenth transistor, a fourteenth transistor, and a fifteenth transistor; wherein a gate of the twelfth transistor is coupled to the third node, a first electrode of the twelfth transistor is coupled to a first electrode of a third transistor, and a second electrode of the twelfth transistor is coupled to a second electrode of the thirteenth transistor; a gate of the thirteenth transistor is coupled to the second node, and a first electrode of the thirteenth transistor is coupled to the first power supply terminal; a gate of the fourteenth transistor is coupled to the third node, a first electrode of the fourteenth transistor is coupled to a second reference signal terminal, and a second electrode of the fourteenth transistor is coupled to the second electrode of the thirteenth transistor; and a gate of the fifteenth transistor is coupled to the third node, a first electrode of the fifteenth transistor is coupled to the second electrode of the fourteenth transistor, and a second electrode of the fifteenth transistor is coupled to the second node.

13. The conduction control circuit according to claim 12, further comprising: a sixth control circuit, configured to control the signal of the third node in response to the signal of the first node, the signal of the third node, and a signal of a second power supply terminal.

14. The conduction control circuit according to claim 13, wherein the sixth control circuit comprises: a sixteenth transistor, a seventeenth transistor, an eighteenth transistor, a nineteenth transistor, and a twentieth transistor; wherein a gate of the sixteenth transistor is coupled to the second node, a first electrode of the sixteenth transistor is coupled to a third reference signal terminal, and a second electrode of the sixteenth transistor is coupled to a first electrode of the seventeenth transistor; a gate of the seventeenth transistor is coupled to the second power supply terminal, a second electrode of the seventeenth transistor is coupled to the second power supply terminal; a gate of the eighteenth transistor is coupled to the first electrode of the seventeenth transistor, a first electrode of the eighteenth transistor is coupled to the third node, and a second electrode of the eighteenth transistor is coupled to the second power supply terminal; a gate of the nineteenth transistor is coupled to the first node, a first electrode of the nineteenth transistor is coupled to the first electrode of the eighteenth transistor, and a second electrode of the nineteenth transistor is coupled to a second reference signal terminal; and a gate of the twentieth transistor is coupled to the second node, a first electrode of the twentieth transistor is coupled to the third node, and a second electrode of the twentieth transistor is coupled to the second reference signal terminal.

15. The conduction control circuit according to claim 14, further comprising: a seventh control circuit, configured to control the signal of the second node in response to the signal of the second node, the signal of the third node, and a signal of a reset signal terminal.

16. The conduction control circuit according to claim 15, wherein the seventh control circuit comprises: a twenty-first transistor, a twenty-second transistor, a twenty-third transistor, a twenty-fourth transistor, and a twenty-fifth transistor; wherein a gate of the twenty-first transistor is coupled to the third node, a first electrode of the twenty-first transistor is coupled to a second reference signal terminal, and a second electrode of the twenty-first transistor is coupled to a first electrode of the twenty-second transistor; a gate of the twenty-second transistor is coupled to the third node, and a second electrode of the twenty-second transistor is coupled to the second node; a gate of the twenty-third transistor is coupled to the second node, a first electrode of the twenty-third transistor is coupled to the first power supply terminal, and a second electrode of the twenty-third transistor is coupled to the first electrode of the twenty-second transistor; a gate of the twenty-fourth transistor is coupled to the reset signal terminal, a first electrode of the twenty-fourth transistor is coupled to the second reference signal terminal, and a second electrode of the twenty-fourth transistor is coupled to the first electrode of the twenty-second transistor; and a gate of the twenty-fifth transistor is coupled to the reset signal terminal, a first electrode of the twenty-fifth transistor is coupled to the second electrode of the twenty-fourth transistor, and a second electrode of the twenty-fifth transistor is coupled to the second node.

17. A display panel, comprising: a display region and a non-display region; wherein the display region comprises: a plurality of sub-pixels, and each of the plurality of sub-pixels comprises a pixel circuit; the non-display region comprises: a timing controller, configured to provide a plurality of gating control signals; a plurality of conduction control circuits each according to claim 1, coupled to the timing controller and the pixel circuit, wherein the plurality of gating control signal terminals are configured to receive the plurality of gating control signals, and the conduction control circuit is configured to provide a signal of the driving output terminal to the pixel circuit in response to the plurality of gating control signals provided by the timing controller.

18. The display panel according to claim 17, wherein the display region further comprises: a plurality of conduction signal lines, and pixel circuits in a column of sub-pixels are coupled to one of the plurality of conduction signal lines; and one of the plurality of conduction signal lines is coupled to the driving output terminal of one of the plurality of conduction control circuits.

19. The display panel according to claim 17, wherein the non-display region further comprises: a data driving circuit, coupled to the pixel circuit and the timing controller, and configured to provide a data signal to the pixel circuit in response to a data signal output by the timing controller; wherein the plurality of conduction control circuits are between the data driving circuit and the display region; or the plurality of conduction control circuits are on a side of the display region away from the data driving circuit.

20. A display device, comprising: the display panel according to claim 17.

* * * * *